United States Patent
Xin et al.

(10) Patent No.: US 11,228,936 B2
(45) Date of Patent: Jan. 18, 2022

(54) SERVICE COMMUNICATION METHOD AND DEVICE

(71) Applicant: HUAWEI TECHNOLOGIES CO., LTD., Guangdong (CN)

(72) Inventors: Yang Xin, Shanghai (CN); Xiaobo Wu, Shanghai (CN); Weiwei Chong, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 118 days.

(21) Appl. No.: 16/573,604

(22) Filed: Sep. 17, 2019

(65) Prior Publication Data

US 2020/0015113 A1    Jan. 9, 2020

Related U.S. Application Data

(63) Continuation of application No. PCT/CN2017/077385, filed on Mar. 20, 2017.

(51) Int. Cl.
*H04W 28/02* (2009.01)
*H04L 12/24* (2006.01)

(52) U.S. Cl.
CPC ..... *H04W 28/0252* (2013.01); *H04L 41/5003* (2013.01); *H04W 28/0284* (2013.01)

(58) Field of Classification Search
None
See application file for complete search history.

(56) References Cited

U.S. PATENT DOCUMENTS

| 8,295,269 B1 | 10/2012 | Hurtta et al. |
| 9,456,388 B2 | 9/2016 | Hori |

(Continued)

FOREIGN PATENT DOCUMENTS

| CN | 101425836 A | 5/2009 |
| CN | 101523809 A | 9/2009 |

(Continued)

OTHER PUBLICATIONS

CATT, Huawei, Update to the Session Management procedures. 3GPP TSG-SA WG2 Meeting #69, Miami, USA, Nov. 17-21, 2008, S2-087376, 19 pages.

(Continued)

*Primary Examiner* — Otis L Thompson, Jr.
(74) *Attorney, Agent, or Firm* — Womble Bond Dickinson (US) LLP

(57) ABSTRACT

This disclosure provides a service communication method and a device, and relates to the field of communications technologies. A solution carried out by access network device is: receiving, from a core network device, a bearer setup request message for requesting to set up a bearer for a service, where the bearer setup request message carries a service requirement of the service; setting up the bearer for the service; sending a bearer setup response message to the core network device, where the bearer setup response message is used to notify the core network device that the access network device has set up the bearer for the service; and sending, a bearer deletion request message to the core network device when the access network device determines that radio channel quality provided by the access network device does not meet the service requirement.

18 Claims, 15 Drawing Sheets

(56) References Cited

U.S. PATENT DOCUMENTS

| | | | |
|---|---|---|---|
| 10,542,575 B1* | 1/2020 | Velusamy | H04W 28/0263 |
| 2009/0257361 A1 | 10/2009 | Deshpande et al. | |
| 2012/0147839 A1* | 6/2012 | Yin | H04W 76/15 |
| | | | 370/329 |
| 2013/0029639 A1 | 1/2013 | Lee et al. | |
| 2013/0287012 A1* | 10/2013 | Pragada | H04W 76/25 |
| | | | 370/338 |
| 2014/0044065 A1* | 2/2014 | Agiwal | H04W 76/40 |
| | | | 370/329 |
| 2014/0066084 A1* | 3/2014 | Paladugu | H04W 72/087 |
| | | | 455/452.2 |
| 2014/0293796 A1* | 10/2014 | Jeong | H04M 15/66 |
| | | | 370/236 |
| 2015/0156807 A1 | 6/2015 | Guo et al. | |
| 2016/0105468 A1 | 4/2016 | Mufti et al. | |
| 2016/0157136 A1 | 6/2016 | Hori et al. | |
| 2016/0249247 A1 | 8/2016 | Zhao et al. | |
| 2018/0255447 A1* | 9/2018 | Chong | H04W 48/02 |
| 2018/0278659 A1* | 9/2018 | Liao | H04W 36/0022 |

FOREIGN PATENT DOCUMENTS

| | | |
|---|---|---|
| CN | 102340815 A | 2/2012 |
| CN | 103548369 A | 1/2014 |
| CN | 106375063 A | 2/2017 |
| WO | 2014026376 A1 | 2/2014 |
| WO | 2015050547 A1 | 4/2015 |

OTHER PUBLICATIONS

3GPP TR 23.750 V14.0.0:"3rd Generation Partnership Project;Technical Specification Group Services and System Aspects;Study for robust call setup for VoLTE subscriber in LTE(Release 14)",Jun. 2016, total 30 pages.

Ericsson,"Add new test case for MT MTSI speech call / EVS / AMR-WB IO mode",3GPP TSG-RAN WG5 Meeting #69 R5-155920,Anaheim, US, Nov. 16-20, 2015,total 6 pages.

3GPP TR 23.759 V0.2.0 (Feb. 2017);3rd Generation Partnership Project;Technical Specification Group Services and System Aspects;Study for enhanced VoLTE Performance(Release 15);total 13 pages.

Telefon AB LM Ericsson,"Use Cases of EVS bitstream interoperability with AMR-WB",3GPP TSG-SA WG4 Meeting #53 S4-090241,San Diego, USA, Apr. 13-17, 2009,total 6 pages.

SA WG2 Meeting #119,S2-170868:"RAN service awareness based solution for key issue 2",Huawei, HiSilicon,Feb. 13-17, 2017, Dubrovnik, Croatia,total 5 pages.

3GPP TS 26.114 V14.3.0 (Mar. 2017);3rd Generation Partnership Project;Technical Specification Group Services and System Aspects;IP Multimedia Subsystem (IMS);Multimedia Telephony;Media handling and interaction(Release 14); total 387 pages.

Ericsson et al.,"Update precondition requirements in test case 12.26",3GPP TSG-RAN WG5 Meeting #71 R5-162926, Nanjing, China, May 23-27, 2016,total 6 pages.

SA WG2 Meeting #119,S2-170867,:RAN non-service awareness based solution for key issue 2, Huawei, HiSilicon, Feb. 13-17, 2017, DubrovniK, Croatia, total 5 pages.

3GPP TR 36.750 V14.0.0 (Sep. 2016);3rd Generation Partnership Project;Technical Specification Group Radio Access Network;Evolved Universal Terrestrial Radio Access (E-UTRA);Study on Voice and Video enhancement for LTE (Release 14);total 28 pages.

Qualcomm Incorporated,"On RAN awareness of codec information", SA WG2 Meeting #117 S2-165666,Oct. 17-21, 2016, Kaohsiung, Taiwan,total 10 pages.

Huawei et al.,"RAN non-service awareness based solution for key issue 2",SA WG2 Meeting #119 S2-170867,Feb. 13-17, 2017, Dubrovnik, Croatia,total 5 pages.

* cited by examiner

SERVICE COMMUNICATION METHOD AND DEVICE

CROSS-REFERENCE TO RELATED APPLICATION

This disclosure is a continuation of International Application No. PCT/CN2017/077385, filed on Mar. 20, 2017. The disclosure of the aforementioned application is hereby incorporated by reference in its entirety.

TECHNICAL FIELD

This disclosure relates to the field of communications technologies, and in particular, to a service communication method and a device.

BACKGROUND

A voice service in a long term evolution (LTE) network is referred to as a voice over long term evolution (VoLTE) service. Currently, more operators have started commercial use of VoLTE, and more terminals can support the VoLTE service.

In the prior art, after receiving a bearer setup request message for a VoLTE service, an access network device directly sets up a bearer (in other words, allocates a radio resource) for the VoLTE service. However, when a terminal is in a weak coverage area of an LTE network, the access network device cannot properly set up the bearer for the VoLTE service, or user experience is relatively poor in a process of executing the VoLTE service.

SUMMARY

This disclosure provides a service communication method and a device, to resolve a problem that when a terminal is in a weak coverage area of an LTE network, an eNB cannot properly set up a bearer for the VoLTE service or user experience is relatively poor in a process of executing the VoLTE service.

To achieve the foregoing objective, the following technical solutions are used in this disclosure.

According to a first aspect, a service communication method is provided, and the service communication method includes: receiving, by an access network device from a core network device or an application function device, a bearer setup request message for setting up a service for a terminal, where the bearer setup request message requests the access network device to set up a bearer for the service, the bearer setup request message carries a service requirement of the service, and the service requirement is used to indicate, to the access network device, a radio channel quality requirement for executing the service by the terminal; setting up, by the access network device, the bearer for the service; sending, by the access network device, a bearer setup response message to the core network device or the application function device, where the bearer setup response message is used to notify the core network device or the application function device that the access network device has set up the bearer for the service; and sending, by the access network device, a bearer deletion request message to the core network device or the application function device when the access network device determines that radio channel quality provided by the access network device does not meet the service requirement, where the deletion request message requests the core network device or the application function device to delete the bearer; or continuing, by the access network device, providing the service for the terminal when the access network device determines that radio channel quality provided by the access network device does not meet the service requirement.

According to the service communication method provided in this disclosure, after receiving the bearer setup request message, the access network device may directly set up the bearer (in other words, allocate a radio resource) for the terminal. However, when the radio channel quality provided by the access network device does not meet the service requirement, the access network device may send the bearer deletion request message to the application function device or the core network device in a timely manner, to delete the bearer that is set up for the service. After the bearer of the service is deleted, a radio resource occupied by the service can be released, so that more radio resources can serve another low-bearer service (namely, a service with a relatively low radio channel quality requirement), and proper execution of the another service can be ensured. For example, when the access network device provides radio resources for both a voice service and a video service, a service requirement (namely, a radio channel quality requirement) of the voice service is lower than a service requirement of the video service. To ensure proper execution of the voice service, the access network device may delete a bearer that is set up for the video service, in other words, delete a radio resource allocated to the video service.

With reference to the first aspect, in an implementation, after receiving the bearer setup request message sent by the core network device or the application function device, the access network device may alternatively determine whether radio channel quality of a first cell of a first network in which the terminal is located meets the service requirement, and set up the bearer for the service when the radio channel quality of the first cell of the first network in which the terminal is located meets the service requirement. In other words, the "setting up, by the access network device, the bearer for the service" may include: setting up, by the access network device, the bearer for the service when the access network device determines that the radio channel quality of the first cell of the first network in which the terminal is located meets the service requirement. The bearer is set up for the service when the radio channel quality of the first cell of the first network in which the terminal is located meets the service requirement, to ensure proper execution of the service, and improve user experience brought by service execution.

With reference to the first aspect or the foregoing implementation, in another implementation, the application function device may instruct, by using identification information such as first identification information, second identification information, or third identification information included in the service requirement, the access network device to send the bearer deletion request message to the core network device or the application function device when radio channel quality that is of a network or a cell and that is provided by the access network device does not meet the service requirement. When the service requirement includes the first identification information, because the first identification information is used to instruct the access network device to send the bearer deletion request message to the core network device or the application function device when the radio channel quality of the first cell of the first network in which the terminal is located does not meet the service requirement, the access network device may send the bearer deletion request message to the core network device or the application function device when the access network device determines that the radio channel quality of the first cell of the first network in which the terminal is located does not meet the service requirement. The "sending, by the access network device, a bearer deletion request message to the core network device or the application function device when the access network device determines that radio channel quality provided by the access network device does not meet the service requirement" may include: sending, by the access network device, the bearer deletion request message to the core network device or the application function device when the access network device determines that the radio channel quality of the first cell of the first network in which the terminal is located does not meet the service requirement, and the service requirement includes the first identification information.

With reference to the first aspect or the foregoing implementations, in another implementation, when the service requirement includes second identification information, because the second identification information is used to instruct the access network device to send the bearer deletion request message to the core network device or the application function device when radio channel quality of a second cell of the first network in which the terminal is located does not meet the service requirement, or neither the radio channel quality of the first cell nor radio channel quality of a second cell meets the service requirement, the access network device sends the bearer deletion request message to the core network device or the application function device when determining that the radio channel quality of the second cell does not meet the service requirement or that neither the radio channel quality of the first cell nor the radio channel quality of the second cell meets the service requirement. The "sending, by the access network device, a bearer deletion request message to the core network device or the application function device when the access network device determines that radio channel quality provided by the access network device does not meet the service requirement" may include: sending, by the access network device, the bearer deletion request message to the core network device or the application function device when the access network device determines that the radio channel quality of the second cell of the first network in which the terminal is located does not meet the service requirement, or the access network device determines that neither the radio channel quality of the first cell of the first network in which the terminal is located nor the radio channel quality of the second cell of the first network in which the terminal is located meets the service requirement, and the service requirement includes the second identification information.

With reference to the first aspect or the foregoing implementations, in another implementation, when the service requirement includes the third identification information, because the third identification information is used to instruct the access network device to send the bearer deletion request message to the core network device or the application function device when radio channel quality of a third cell of a second network in which the terminal is located does not meet the service requirement, or neither radio channel quality of a second cell nor radio channel quality of a third cell meets the service requirement, or none of the radio channel quality of the first cell, radio channel quality of a second cell, and radio channel quality of a third cell meets the service requirement, the access network device sends the bearer deletion request message to the core network device or the application function device when the access network device determines that the radio channel quality of the third cell does not meet the service requirement, or that neither the radio channel quality of the second cell nor the radio channel quality of the third cell meets the service requirement, or that none of the radio channel quality of the first cell, the radio channel quality of the second cell, and the radio channel quality of the third cell meets the service requirement. The "sending, by the access network device, a bearer deletion request message to the core network device or the application function device when the access network device determines that radio channel quality provided by the access network device does not meet the service requirement" may include: sending, by the access network device, the bearer deletion request message to the core network device or the application function device when the access network device determines that the radio channel quality of the third cell of the second network in which the terminal is located does not meet the service requirement, or that neither the radio channel quality of the second cell of the first network in which the terminal is located nor the radio channel quality of the third cell of the second network in which the terminal is located meets the service requirement, or that none of the radio channel quality of the first cell of the first network in which the terminal is located, the radio channel quality of the second cell of the first network in which the terminal is located, and the radio channel quality of the third cell of the second network in which the terminal is located meets the service requirement, and the service requirement includes the third identification information.

With reference to any one of the first aspect or the foregoing implementations, in another implementation, to avoid an interruption of voice communication and impact on user experience due to deletion of a bearer of the voice service, when determining that the service is a voice service, the access network device does not send the bearer deletion request message to the core network device or the application function device even if the radio channel quality provided by the access network device does not meet the service requirement. Before the sending, by the access network device, a bearer deletion request message to the core network device or the application function device, the service communication method may further include: skipping, by the access network device, sending the bearer deletion request message to the core network device or the application function device if the access network device determines that the service is a voice service. In this disclosure, when the service is a voice service, the access network device does not send the bearer deletion request message to the core network device or the application function device regardless of whether the radio channel quality provided by the access network device meets the service requirement.

With reference to any one of the first aspect or the foregoing implementations, in another implementation, the service requirement includes at least one of service type indication information of the service, a radio channel requirement parameter of the service, coding information of the service, a coding information list of the terminal, and a terminal type of the terminal, and the coding information list of the terminal includes coding information supported by both the terminal and the application function device.

With reference to any one of the first aspect or the foregoing implementations, in another implementation, after the "setting up, by the access network device, the bearer for the service", and before the "sending, by the access network device, a bearer deletion request message to the core network device or the application function device when the access network device determines that radio channel quality provided by the access network device does not meet the service requirement", the service communication method may further include: parsing, by the access network device, application layer signaling between the terminal and the application function device, and determining that the terminal currently uses first coding information to perform data communication of the service, where the first coding information includes a first coding type and a first coding rate; determining, by the access network device, first indication information of the service based on first current network status information of the terminal, where the first current network status information includes that the access network device determines that current radio channel quality of a cell in which the terminal is located is less than a first preset threshold or that a network to which the terminal is attached is congested, the first indication information is a first transmission rate and the first transmission rate corresponds to second coding information, or the first indication information is second coding information, and the second coding information includes a second coding type and a second coding rate; and sending, by the access network device, a first notification message to the terminal, where the first notification message carries the first indication information, and the first notification message is used to instruct the terminal to adjust the coding information of the service from the first coding information to the second coding information.

In this disclosure, when the radio channel quality provided by the access network device does not meet the service requirement, the access network device may not delete the bearer that is set up for the service, but instruct the terminal to adjust the coding information used for performing data communication of the service, for example, instruct the terminal to adjust the coding information of the service from an adaptive multi-rate (AMR) to an enhanced voice service (EVS). Different coding information includes different coding types and coding rates. For example, the EVS may provide a higher coding rate than the AMR. In this case, a manner of performing data communication of the service can be improved, and it is ensured that the service is properly executed or service execution can bring relatively good user experience.

With reference to any one of the first aspect or the foregoing implementations, in another implementation, because radio channel quality of each cell in a network may change at any time, after the coding information for performing data communication of the service is adjusted from the first coding information to the second coding information, radio channel quality of the cell in which the terminal is located may be improved. In this case, the access network device may instruct the terminal to adjust the coding information for performing data communication of the service from the second coding information back to the first coding information. After the sending, by the access network device, a first notification message to the terminal, the service communication method may further include: determining, by the access network device, second indication information of the service of the terminal based on current second current network status information of the terminal, where the second current network status information is that the access network device determines that current radio channel quality of the cell in which the terminal is located is greater than a second preset threshold or that the network to which the terminal is attached is not congested, and the second indication information is a second transmission rate and the second transmission rate corresponds to the second coding information, or the second indication information is the second coding information; and sending, by the access network device, a second notification message to the terminal, where the second notification message carries the second indication information, and the second notification message is used to instruct the terminal to adjust the coding information of the service from the second coding information to the first coding information.

When the current radio channel quality of the cell in which the terminal is located is greater than the second preset threshold or the network to which the terminal is attached is not congested, the access network device may instruct the terminal to adjust the coding information of the service from the second coding information back to the first coding information. In this way, the application function device does not need to frequently perform conversion between the first coding type and the second coding type in a process of performing data communication of the service of the terminal, to simplify a data communication procedure of the service of the terminal and improve data communication efficiency.

With reference to any one of the first aspect or the foregoing implementations, in another implementation, after the "sending, by the access network device, a bearer deletion request message to the core network device or the application function device", the application function device may send a bearer update request to the access network device, to request the access network device to set up a bearer for the service again. After the "sending, by the access network device, a bearer deletion request message to the core network device or the application function device", the method in this disclosure may further include: receiving, by the access network device, the bearer update request from the application function device, where the bearer update request is used to request the access network device to set up a bearer for the service again; and sending, by the access network device, a service update response to the application function device, where the bearer update response is used to notify the application function device that the access network device has set up the bearer for the service again.

According to a second aspect, a service communication method is provided, and the service communication method includes: parsing, by a terminal, application layer signaling between the terminal and an application function device, and determining that the terminal uses first coding information to perform data communication of a service, where the first coding information includes a first coding type and a first coding rate; receiving, by the terminal, a first notification message from an access network device, where the first notification message carries first indication information; the first indication information is a first transmission rate and the first transmission rate corresponds to second coding information, or the first indication information is second coding information, and the second coding information includes a second coding type and a second coding rate; and adjusting, by the terminal, coding information of the service from the first coding information to the second coding information.

In this disclosure, the terminal may adjust, based on an indication of the access network device, the coding information used for performing data communication of the service. For example, the terminal is instructed to adjust the coding information of the service from an AMR to an EVS. Different coding information includes different coding types and coding rates. For example, the EVS may provide a higher coding rate than the AMR. In this case, a manner of performing data communication of the service can be improved, and it is ensured that the service is properly executed or service execution can bring relatively good user experience.

With reference to the second aspect, in an implementation, after adjusting the coding information of the service from the first coding information to the second coding information, the terminal may use the second coding information to perform data communication of the service with a peer terminal (for example, a terminal of a called party). However, the peer terminal (for example, the terminal of the called party) may not support a coding manner of the second coding information. In this case, the terminal may instruct the application function device to perform conversion between the first coding type and the second coding type in a process of performing data communication of the service. In this way, even if the peer terminal (for example, the terminal of the called party) does not support the coding manner of the second coding information, data communication between the terminal and the peer terminal is not affected. Therefore, the service communication method may further include: sending, by the terminal, a first conversion request to the application function device, where the first conversion request carries the second coding information, and the first conversion request is used to instruct the application function device to perform conversion between the first coding type and the second coding type in the process of performing data communication of the service.

With reference to the second aspect and the foregoing implementation, in another implementation, because radio channel quality of each cell in a network may change at any time, after the terminal adjusts the coding information of the service from the first coding information to the second coding information, radio channel quality of a cell in which the terminal is located may be improved. In this case, the access network device may instruct the terminal to adjust the coding information for performing data communication of the service from the second coding information back to the first coding information. The service communication method further includes: receiving, by the terminal, a second notification message from the access network device, where the second notification message carries second indication information, and the second indication information is a second transmission rate and the second transmission rate corresponds to the first coding information, or the second indication information is the first coding information; and adjusting, by the terminal, the coding information of the service from the second coding information to the first coding information.

With reference to any one of the second aspect or the foregoing implementations, in another implementation, after the adjusting, by the terminal, the coding information of the service from the second coding information to the first coding information, the service communication method may further include: sending, by the terminal, a second conversion request to the application function device, where the second conversion request carries the first coding information, and the second conversion request is used to instruct the application function device to stop performing conversion between the first coding type and the second coding type in the process of performing data communication of the service.

According to a third aspect, a service communication method is provided, and the service communication method includes: parsing, by an application function device, application layer signaling between a terminal and the application function device, and determining that the terminal uses first coding information to perform data communication of a service, where the first coding information includes a first coding type and a first coding rate; receiving, by the application function device, a first conversion request from the terminal, where the first conversion request carries second coding information, the second coding information includes a second coding type and a second coding rate, and the first conversion request is used to instruct the application function device to perform conversion between the first coding type and the second coding type in a process of performing data communication of the service; and instructing, by the application function device, an access transfer gateway to perform conversion between the first coding type and the second coding type in the process of performing data communication of the service of the terminal.

After adjusting coding information of the service from the first coding information to the second coding information, the terminal may use the second coding information to perform data communication of the service with a peer terminal (for example, a terminal of a called party). However, the peer terminal (for example, the terminal of the called party) may not support a coding manner of the second coding information. The application function device may perform, based on an indication of an access network device, conversion between the first coding type and the second coding type in the process of performing data communication of the service of the terminal. In this way, even if the peer terminal (for example, the terminal of the called party) does not support the coding manner of the second coding information, data communication between the terminal and the peer terminal (for example, the terminal of the called party) is not affected.

With reference to the third aspect, in an implementation, after the terminal adjusts the coding information of the service from the second coding information back to the first coding information, the application function device no longer needs to perform conversion between the first coding type and the second coding type. After the receiving, by the application function device, a first conversion request from the terminal, the service communication method may further include: receiving, by the application function device, a second conversion request from the terminal, where the second conversion request carries the first coding information, and the second conversion request is used to instruct the application function device to stop performing conversion between the first coding type and the second coding type in the process of performing data communication of the service; and instructing, by the application function device, the access transfer gateway to stop performing conversion between the first coding type and the second coding type in the process of performing data communication of the service of the terminal.

With reference to the third aspect and the foregoing implementation, in another implementation, after the "instructing, by the application function device, an access transfer gateway to perform conversion between the first coding type and the second coding type in the process of performing data communication of the service of the terminal", the service communication method may further include: receiving, by the application function device, a bearer deletion request message from an access network device or a core network device; and deleting, by the application function device, a bearer of the service. The bearer deletion request message is used to instruct a service application server to delete a bearer that is set up by the access network device for the service. The bearer deletion request message is sent by the access network device when radio channel quality provided by the access network device does not meet a service requirement. After the bearer of the service is deleted, a radio resource occupied by the service can be released, so that more radio resources can serve another low-bearer service (namely, a service with a relatively low radio channel quality requirement), and proper execution of the another service can be ensured. For example, when the access network device provides radio resources for both a voice service and a video service, a service requirement (namely, a radio channel quality requirement) of the voice service is lower than a service requirement of the video service. To ensure proper execution of the voice service, the access network device may delete a bearer that is set up for the video service, in other words, delete a radio resource allocated to the video service.

With reference to the third aspect and the foregoing implementations, in another implementation, after deleting the bearer of the service, the application function device may send a bearer update request to the access network device, to request the access network device to set up a bearer for the service again. The method in this disclosure may further include: sending, by the application function device, the bearer update request to the access network device, where the bearer update request is used to request the access network device to set up a bearer for the service again; receiving, by the application function device, a service update response from the access network device, where the bearer update response is used to notify the application function device that the access network device has set up a bearer for the service again.

According to a fourth aspect, an access network device is provided, including: a receiving module, a setup module, and a sending module; or a receiving module, a setup module, a sending module, and a service processing module. The receiving module is configured to receive, from a core network device or an application function device, a bearer setup request message for setting up a service for a terminal, where the bearer setup request message requests the access network device to set up a bearer for the service, the bearer setup request message carries a service requirement of the service, and the service requirement is used to indicate, to the access network device, a radio channel quality requirement for executing the service by the terminal. The setup module is configured to set up the bearer for the service. The sending module is configured to send a bearer setup response message to the core network device or the application function device, where the bearer setup response message is used to notify the core network device or the application function device that the access network device has set up the bearer for the service. The sending module is further configured to send a bearer deletion request message to the core network device or the application function device when it is determined that radio channel quality provided by the access network device does not meet the service requirement, where the deletion request message requests the core network device or the application function device to delete the bearer; or the service processing module is configured to continue providing the service for the terminal when it is determined that radio channel quality provided by the access network device does not meet the service requirement.

With reference to the fourth aspect, in a implementation, the setup module may be configured to set up the bearer for the service when it is determined that radio channel quality of a first cell of a first network in which the terminal is located meets the service requirement.

With reference to the fourth aspect and the foregoing implementation, in another implementation, the access network device may further include a control module. Before the sending module sends the bearer deletion request message to the core network device or the application function device, the control module is configured to control the sending module not to send the bearer deletion request message to the core network device or the application function device if it is determined that the service is a voice service.

With reference to any one of the fourth aspect and the foregoing implementations, in another implementation, the sending module may be configured to send the bearer deletion request message to the core network device or the application function device when the access network device determines that the radio channel quality of the first cell of the first network in which the terminal is located does not meet the service requirement, and the service requirement includes first identification information. The first identification information is used to instruct the access network device to send the bearer deletion request message to the core network device or the application function device when the radio channel quality of the first cell does not meet the service requirement.

With reference to any one of the fourth aspect and the foregoing implementations, in another implementation, the sending module may be configured to send the bearer deletion request message to the core network device or the application function device when the access network device determines that radio channel quality of a second cell of the first network in which the terminal is located does not meet the service requirement, or the access network device determines that neither the radio channel quality of the first cell of the first network in which the terminal is located nor radio channel quality of a second cell of the first network in which the terminal is located meets the service requirement, and the service requirement includes second identification information. The second identification information is used to instruct the access network device to send the bearer deletion request message to the core network device or the application function device when the radio channel quality of the second cell does not meet the service requirement, or neither the radio channel quality of the first cell nor the radio channel quality of the second cell meets the service requirement.

With reference to any one of the fourth aspect and the foregoing implementations, in another implementation, the sending module may be configured to send the bearer deletion request message to the core network device or the application function device when the access network device determines that radio channel quality of a third cell of a second network in which the terminal is located does not meet the service requirement, or that neither radio channel quality of a second cell of the first network in which the terminal is located nor radio channel quality of a third cell of a second network in which the terminal is located meets the service requirement, or that none of the radio channel quality of the first cell of the first network in which the terminal is located, radio channel quality of a second cell of the first network in which the terminal is located, and radio channel quality of a third cell of a second network in which the terminal is located meets the service requirement, and the service requirement includes third identification information. The third identification information is used to instruct the access network device to send the bearer deletion request message to the core network device or the application function device when the radio channel quality of the third cell does not meet the service requirement, or neither the radio channel quality of the second cell nor the radio channel quality of the third cell meets the service requirement, or none of the radio channel quality of the first cell, the radio channel quality of the second cell, and the radio channel quality of the third cell meets the service requirement.

With reference to any one of the fourth aspect and the foregoing implementations, in another implementation, the service requirement includes at least one of service type indication information of the service, a radio channel requirement parameter of the service, coding information of the service, a coding information list of the terminal, and a terminal type of the terminal, and the coding information list of the terminal includes coding information supported by both the terminal and the application function device.

With reference to any one of the fourth aspect and the foregoing implementations, in another implementation, the access network device may further include a determining module. After the setup module sets up the bearer, and before the sending module sends the bearer deletion request message to the core network device or the application function device when the radio channel quality provided by the access network device does not meet the service requirement, the determining module may be configured to: parse application layer signaling between the terminal and the application function device, and determine that the terminal currently uses first coding information to perform data communication of the service, where the first coding information includes a first coding type and a first coding rate; and determine first indication information of the service based on first current network status information of the terminal, where the first current network status information includes that the access network device determines that current radio channel quality of a cell in which the terminal is located is less than a first preset threshold or that a network to which the terminal is attached is congested, the first indication information is a first transmission rate and the first transmission rate corresponds to second coding information, or the first indication information is second coding information, and the second coding information includes a second coding type and a second coding rate. The sending module may be further configured to send a first notification message to the terminal, where the first notification message carries the first indication information determined by the determining module, and the first notification message is used to instruct the terminal to adjust the coding information of the service from the first coding information to the second coding information.

With reference to any one of the fourth aspect and the foregoing implementations, in another implementation, after the sending module sends the first notification message to the terminal, the determining module is further configured to determine second indication information of the service of the terminal based on current second current network status information of the terminal, where the second current network status information is that the access network device determines that current radio channel quality of the cell in which the terminal is located is greater than a second preset threshold or that the network to which the terminal is attached is not congested, and the second indication information is a second transmission rate and the second transmission rate corresponds to the second coding information, or the second indication information is the second coding information. The sending module is further configured to send a second notification message to the terminal, where the second notification message carries the second indication information, and the second notification message is used to instruct the terminal to adjust the coding information of the service from the second coding information to the first coding information.

According to a fifth aspect, an access network device is provided. The access network device includes a processor, a memory, and a communications interface, and the processor, the memory, and the communications interface are connected by using a bus. The memory is configured to store computer program code, and the computer program code includes an instruction. When the processor of the access network device executes the instruction, the access network device performs the service communication method according to the first aspect and the foregoing implementations of the first aspect.

According to a sixth aspect, a computer storage medium is provided. The computer storage medium stores computer program code, and the computer program code includes an instruction. When a processor of an access network device executes the instruction, the access network device performs the service communication method according to the first aspect and the foregoing implementations of the first aspect.

It should be noted that the modules of the access network device in the fourth aspect, the fifth aspect, and the foregoing implementations of the fourth aspect and the fifth aspect in the embodiments of this disclosure are obtained by performing function division on the access network device, to implement the service communication method according to the first aspect and the foregoing implementations of the first aspect. For detailed descriptions and effect analyses of functions implemented by the modules in the fourth aspect, the fifth aspect, and the foregoing implementations of the fourth aspect and the fifth aspect, refer to the detailed descriptions in the first aspect and the foregoing implementations of the first aspect. Details are not described again in this embodiment of this disclosure.

According to a seventh aspect, a terminal is provided, and the terminal includes a determining module, a receiving module, and an adjustment module. The determining module is configured to: parse application layer signaling between the terminal and an application function device, and determine that the terminal uses first coding information to perform data communication of a service, where the first coding information includes a first coding type and a first coding rate. The receiving module is configured to receive a first notification message from an access network device, where the first notification message carries first indication information; the first indication information is a first transmission rate and the first transmission rate corresponds to second coding information, or the first indication information is second coding information, and the second coding information includes a second coding type and a second coding rate. The adjustment module is configured to adjust coding information of the service from the first coding information to the second coding information.

With reference to the seventh aspect, in a implementation, the terminal may further include a sending module. After the adjustment module adjusts the coding information of the service from the first coding information to the second coding information, the sending module is configured to send a first conversion request to the application function device, where the first conversion request carries the second coding information, and the first conversion request is used to instruct the application function device to perform conversion between the first coding type and the second coding type in a process of performing data communication of the service.

With reference to the seventh aspect and the foregoing implementation, in another implementation, after the adjustment module adjusts the coding information of the service from the first coding information to the second coding information, the receiving module is further configured to receive a second notification message from the access network device, where the second notification message carries second indication information, and the second indication information is a second transmission rate and the second transmission rate corresponds to the first coding information, or the second indication information is the first coding information. The adjustment module is further configured to adjust the coding information of the service from the second coding information to the first coding information.

With reference to any one of the seventh aspect and the foregoing implementations, in another implementation, after the adjustment module adjusts the coding information of the service from the second coding information to the first coding information, the sending module is further configured to send a second conversion request to the application function device, where the second conversion request carries the first coding information, and the second conversion request is used to instruct the application function device to stop performing conversion between the first coding type and the second coding type in the process of performing data communication of the service.

According to an eighth aspect, a terminal is provided. The terminal includes a processor, a memory, and a communications interface, and the processor, the memory, and the communications interface are connected by using a bus. The memory is configured to store computer program code, and the computer program code includes an instruction. When the processor of the terminal executes the instruction, the terminal performs the service communication method according to the second aspect and the foregoing implementations of the second aspect.

According to a ninth aspect, a computer storage medium is provided. The computer storage medium stores computer program code, and the computer program code includes an instruction. When a processor of a terminal executes the instruction, the terminal performs the service communication method according to the second aspect and the foregoing implementations of the second aspect.

It should be noted that the modules of the terminal in the seventh aspect, the eighth aspect, and the foregoing implementations of the seventh aspect and the eighth aspect in the embodiments of this disclosure are obtained by performing function division on the terminal, to implement the service communication method according to the second aspect and the foregoing implementations of the second aspect. For detailed descriptions and effect analyses of functions implemented by the modules in the seventh aspect, the eighth aspect, and the foregoing implementations of the seventh aspect and the eighth aspect, refer to the detailed descriptions in the second aspect and the foregoing implementations of the second aspect. Details are not described herein again in this embodiment of this disclosure.

According to a tenth aspect, an application function device is provided, and the application function device includes a determining module, a receiving module, and a notification module. The determining module is configured to: parse application layer signaling between a terminal and the application function device, and determine that the terminal uses first coding information to perform data communication of a service, where the first coding information includes a first coding type and a first coding rate. The receiving module is configured to receive a first conversion request from the terminal, where the first conversion request carries second coding information, the second coding information includes a second coding type and a second coding rate, and the first conversion request is used to instruct the application function device to perform conversion between the first coding type and the second coding type in a process of performing data communication of the service. The notification module is configured to instruct an access transfer gateway to perform conversion between the first coding type and the second coding type in the process of performing data communication of the service of the terminal.

With reference to the tenth aspect, in an implementation, after receiving the first conversion request from the terminal, the receiving module may be further configured to receive a second conversion request from the terminal, where the second conversion request carries the first coding information, and the second conversion request is used to instruct the application function device to stop performing conversion between the first coding type and the second coding type in the process of performing data communication of the service. The notification module is further configured to instruct the access transfer gateway to stop performing conversion between the first coding type and the second coding type in the process of performing data communication of the service of the terminal.

According to an eleventh aspect, an application function device is provided. The application function device includes a processor, a memory, and a communications interface, and the processor, the memory, and the communications interface are connected by using a bus. The memory is configured to store computer program code, and the computer program code includes an instruction. When the processor of the application function device executes the instruction, the application function device performs the service communication method according to the third aspect and the foregoing implementations of the third aspect.

According to a twelfth aspect, a computer storage medium is provided. The computer storage medium stores computer program code, and the computer program code includes an instruction. When a processor of an application function device executes the instruction, the application function device performs the service communication method according to the third aspect and the foregoing implementations of the third aspect.

It should be noted that the modules of the terminal in the tenth aspect, the eleventh aspect, and the foregoing implementations of the tenth aspect and the eleventh aspect in the embodiments of this disclosure are obtained by performing function division on the application function device to implement the service communication method according to the second aspect and the foregoing implementations of the second aspect. For detailed descriptions and effect analyses of functions implemented by the modules in the tenth aspect, the eleventh aspect, and the foregoing implementations of the tenth aspect and the eleventh aspect, refer to the detailed descriptions in the third aspect and the foregoing implementations of the third aspect. Details are not described in this embodiment of this disclosure again.

DESCRIPTION OF EMBODIMENTS

In the specification, claims, and accompanying drawings of this disclosure, the terms "first", "second", and so on are intended to distinguish between different objects but do not indicate a particular order. For example, first coding information and second coding information may be used to represent different coding information, rather than a specific sequence of coding information.

Technical solutions of this disclosure may be applied to an LTE network. The technical solutions of this disclosure may not only be applied to not only a VoLTE service and a video call service, but also another service that has a similar network signal coverage requirement. A service type of user equipment and a network in which the user equipment is located are not limited in this disclosure.

Figure 1:
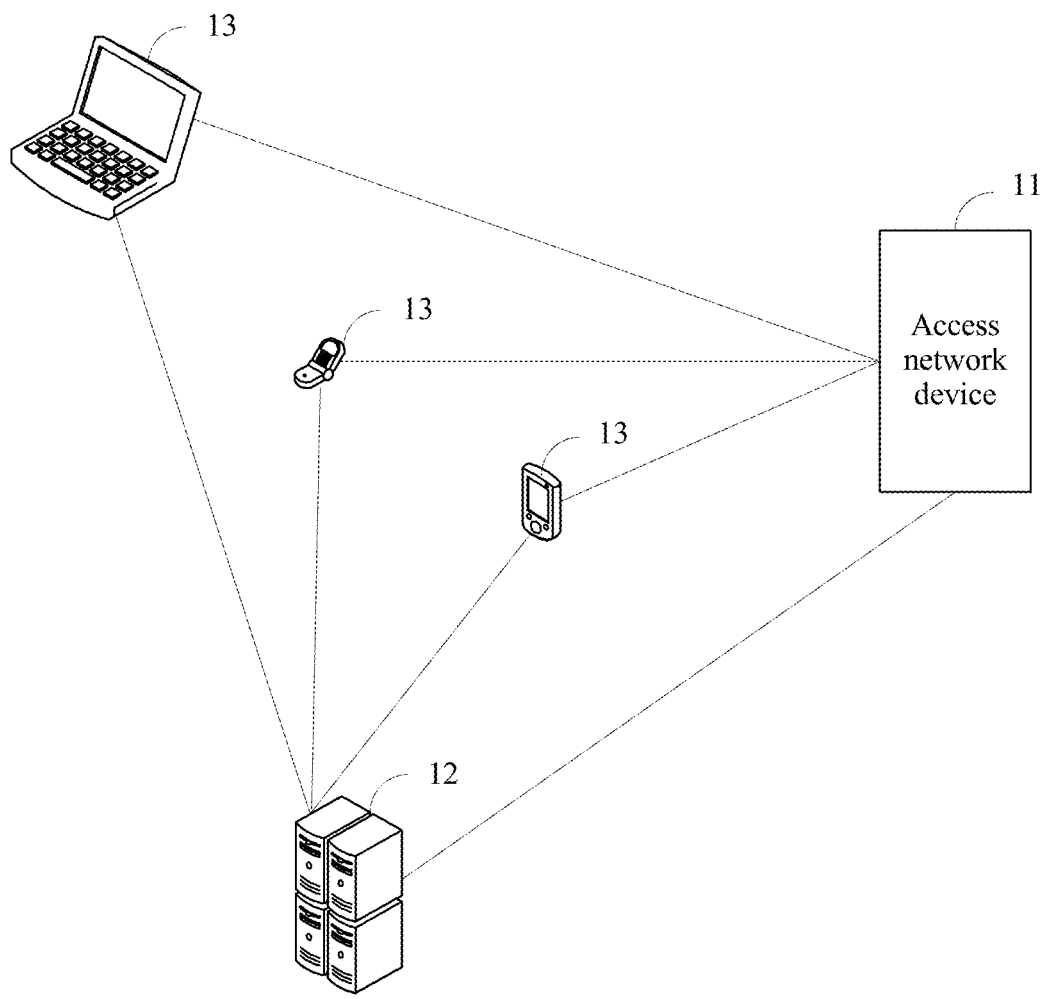
FIG. 1 is a first schematic diagram of a network architecture of a communications network according to an embodiment of this disclosure.

FIG. 1 is a schematic diagram of a network architecture of a communications network according to an embodiment of this disclosure. As shown in FIG. 1, the communications network may include an access network device 11, an application function device 12, and at least one user equipment (UE) 13. The access network device 11 and the UE 13 may be connected by using a wireless communication link, and the application function device 12 is configured to process a service registration request, user management, session control, service switching, service control, and the like of the UE. Another core network device 14 may further exist between the access network device 11 and the application function device 12, and is configured to perform a connection function for a service between the UE 13 and the application function device 12.

Figure 2:
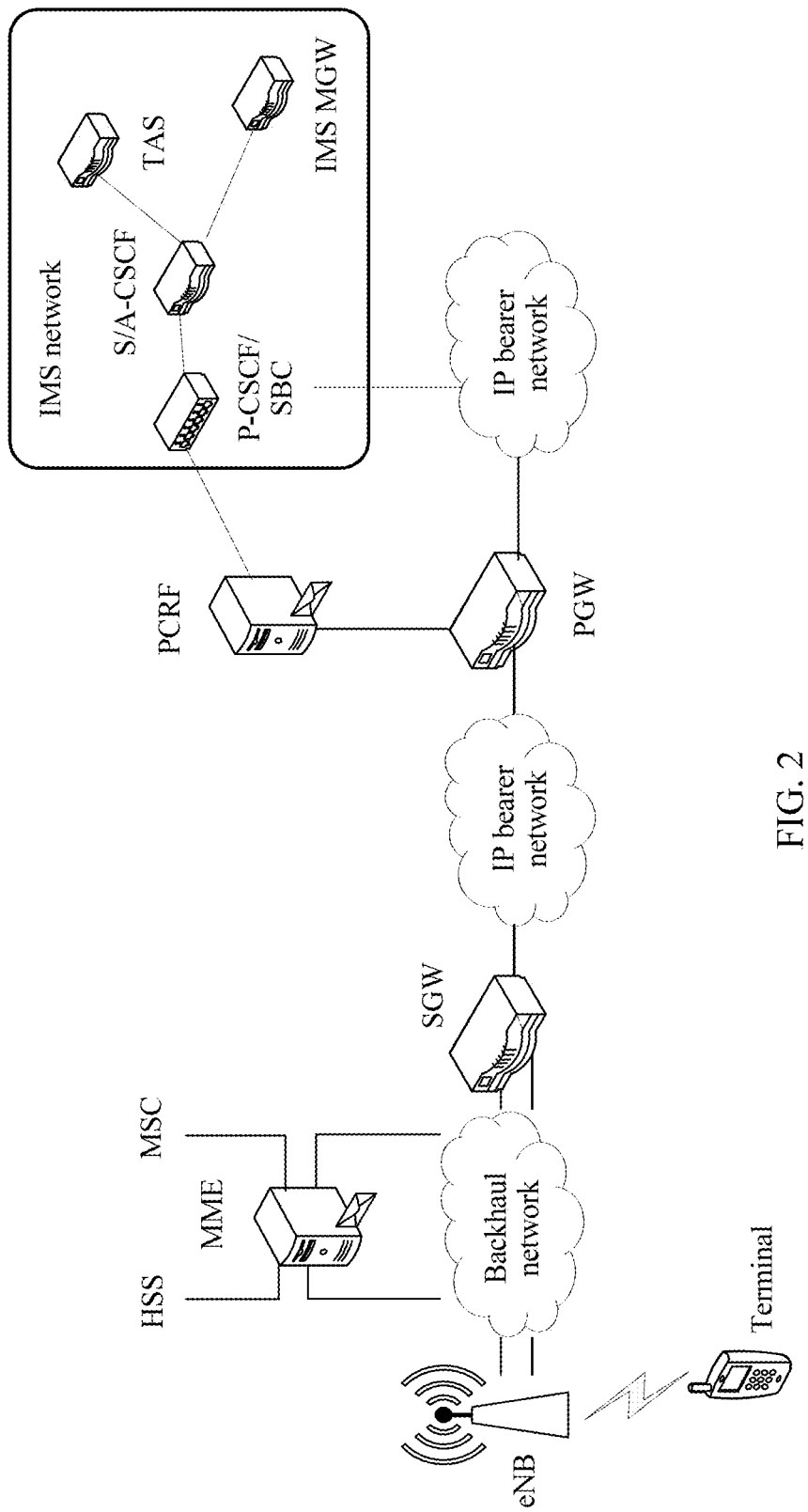
FIG. 2 is a second schematic diagram of a network architecture of a communications network according to an embodiment of this disclosure.

FIG. 2 shows an actual example, specific to a 4G network, of the network architecture of the communications network shown in FIG. 1. An evolved NodeB (eNB) in FIG. 2 is used as the access network device in FIG. 1, and the eNB and UE (namely, the UE 13 in FIG. 1) may be communicatively connected by using a radio link. A core network device of an LTE network in the network architecture shown in FIG. 2 may include a mobility management entity (MME), a serving gateway (SGW), a packet data network gateway (PGW), a policy and charging rules function (PCRF) entity, or the like. The core network device may be responsible for performing a connection function for connecting a service such as a VoLTE service of the UE to an internet protocol multimedia subsystem (IMS) network, and is responsible for transmitting VoLTE call-related signaling, or the like between the UE and the IMS network. In addition, the core network device may be further responsible for setting up a dedicated bearer (for example, quality of service class identifier (QCI)=1) that is related to the core network device and that is used to transmit related user plane data (media data) of the VoLTE service.

An IMS network device shown in FIG. 2, such as a proxy-call session control function (P-CSCF) entity, an interrogating/serving call session control function (I/S-CSCF) entity, or a service centralization and continuity application server (SCC AS), may be used as any application function device in this embodiment of this disclosure.

The P-CSCF entity (which may be classified into a P-CSCF entity of a calling party and a P-CSCF entity of a called party) is a first contact point at which the UE accesses the IMS network in a process of the service such as the VoLTE service. The P-CSCF entity may be responsible for representing related signaling of the service such as the VoLTE service and completing routing control. The S-CSCF entity (which may be classified into an S-CSCF entity of the calling party and an S-CSCF entity of the called party) is a service switching center of the IMS network. The S-CSCF entity is mainly responsible for receiving and processing a registration request, user management, session control, service switching, service control, session initiation protocol (SIP) message processing, charging, and the like that are of the UE. The SCC AS (which may be classified into an SCC AS of the calling party and an SCC AS of the called party), and is configured to maintain service continuity for the UE when the UE moves between the LTE network and another network.

The UE in this embodiment of this disclosure may be a wireless terminal or a wired terminal. For example, the UE may be a mobile phone, a computer, a tablet computer, a personal digital assistant (PDA), a mobile Internet device (MID), a wearable device, or an e-book reader.

The protection solution of this disclosure may be applied to a scenario in which user experience of a CS voice service is ensured. In addition, VoLTE quality is also closely related to voice coding. Therefore, in an application scenario of this disclosure, an IMS core network device (for example, a P-CSCF/an S-CSCF/an SCC AS/an access transfer control function (ATCF)) further needs to support voice coding used by VoLTE UE and adjustment of a coding rate, and support coding conversion.

Figure 3:
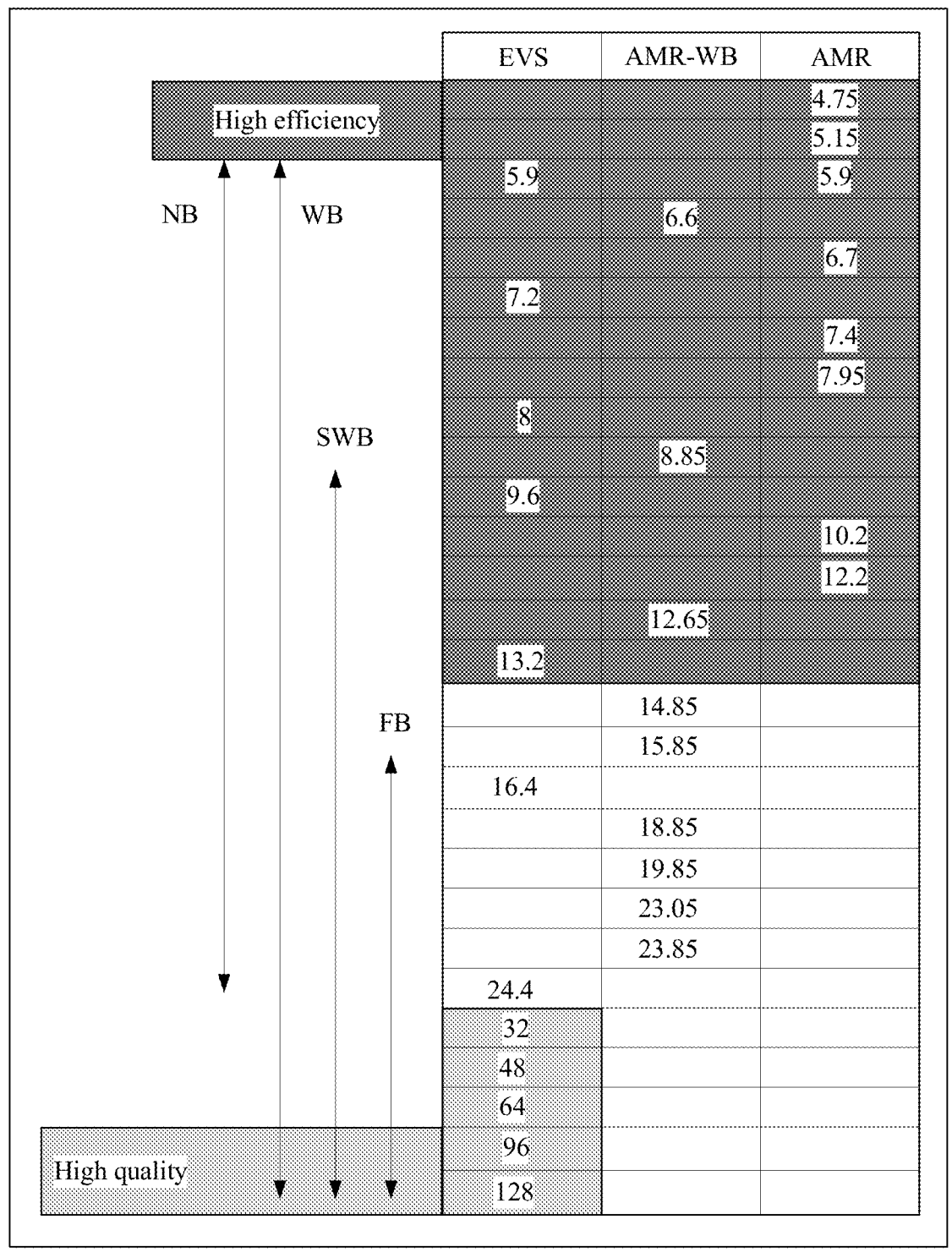
FIG. 3 is a schematic diagram of distribution of coding rates according to an embodiment of this disclosure.

The VoLTE coding may mainly include adaptive multi-rate narrowband (AMR-NB) Speech Codec, adaptive multi-rate wideband (AMR WB) Speech Codec, and enhanced voice service (EVS) coding. FIG. 3 is a schematic diagram of distribution of coding rates of the three coding types: AMR NB coding, AMR WB coding, and EVS coding.

Some technical solutions in the embodiments of this disclosure may be implemented based on the communications network architecture shown in FIG. 1 or FIG. 2 or a variant thereof.

Figure 4:
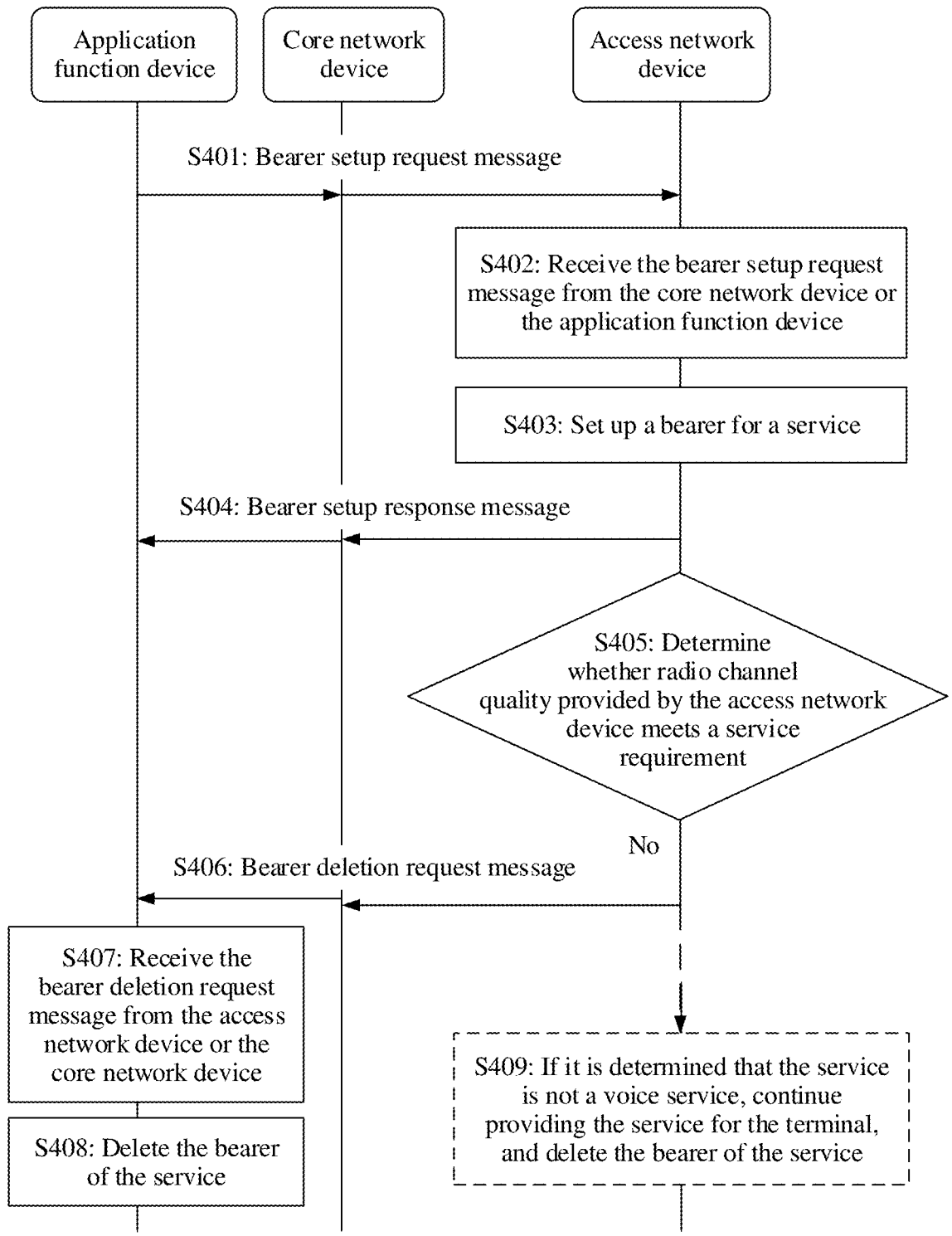
FIG. 4 is a first flowchart of a service communication method according to an embodiment of this disclosure.

An embodiment of this disclosure provides a service communication method. As shown in FIG. 4, the service communication method includes the following operations.

S401: An application function device sends a bearer setup request message to an access network device or a core network device.

The bearer setup request message requests the access network device to set up a bearer for a service of a terminal, the bearer setup request message carries a service requirement of a service that is set up for the terminal, and the service requirement is used to indicate, to the access network device, a radio channel quality requirement for executing the service by the terminal.

It should be noted that the application function device in this embodiment of this disclosure is an application function device of an IMS network, for example, any one or a combination of at least two of a P-CSCF, an ATCF, an S-CSCF, and an SCC AS.

The bearer setup request message may be delivered by the application function device to the access network device after the application function device receives a request message for setting up a service for the terminal. The service may be a VoLTE service, a video service, or a service of another service type.

For example, the service is a VoLTE service. After receiving an invite message for setting up the VoLTE service for the terminal, the application function device (for example, the P-CSCF, the ATCF, the S-CSCF, or the SCC AS) may send a bearer setup request message (namely, the foregoing bearer setup request message) to the access network device (for example, an eNB). The bearer setup request message is used to request the access network device (for example, the eNB) to set up a bearer (in other words, allocate a radio network resource) for the VoLTE voice service. The terminal may be a terminal of a calling party, and the application function device is correspondingly an application function device of the calling party; or the terminal may be a terminal of a called party, and the application function device is correspondingly an application function device of the called party.

For example, the application function device may send the bearer setup request message to the access network device by using either of the following two implementations.

Manner 1: The application function device delivers the bearer setup request message to the access network device by using the core network device.

The VoLTE service is used as an example. After receiving the invite message for setting up the VoLTE service for the terminal, the application function device may send an authentication and authorization request to a PCRF, to trigger an evolved packet system (EPS) core network device to initiate a process of setting up a voice-dedicated bearer. The authentication and authorization request includes radio channel quality requirement information of the VoLTE service. The EPS core network device may send a voice-dedicated bearer setup request message to the access network device, and the voice-dedicated bearer setup request message includes the radio channel quality requirement information of the VoLTE service.

Manner 2: The application function device delivers the bearer setup request message to the access network device through an interface between the application function device and the access network device.

The interface between the application function device and the access network device may be a private interface that is provided by a device manufacturer between the application function device and the access network device. The application function device may directly deliver the bearer setup request message (for example, the bearer setup request message for the VoLTE service) to the access network device through the private interface, and the bearer setup request message carries radio channel quality requirement information of the service. A related request message (for example, the bearer setup request message) sent through the private interface may be carried in an extension header of an RTP stream.

Optionally, the radio channel quality requirement information of the service may be information that directly reflects the radio channel quality requirement of the service, for example, at least one of an reference signal received power (RSRP) requirement, an reference signal received quality (RSRQ) requirement, or a signal-to-noise and interference ratio (SINR) requirement. The radio channel quality requirement information of the service may be information that indirectly reflects the radio channel quality requirement of the service, for example, at least one of service type indication information of the service, coding information of the service, a coding information list of the terminal, and terminal type information of UE. The coding information list of the UE includes coding information supported by both the UE and the application function device. The coding information of the service includes coding type information of the service and coding rate set information of the service. The terminal type information of the UE includes at least one of an IMEI of the UE, a type allocation code (TAC) of the international mobile equipment identity (IMEI), and an international mobile subscriber identity (IMSI) of the user equipment (UE).

A manner in which the radio channel quality requirement information of the service indicates the radio channel quality requirement for executing the service by the UE is provided below by using an example.

For example, it is assumed that the radio channel quality requirement information of the service includes the service type indication information of the service. The access network device may determine a type of the service (for example, a VoLTE service, a video service, or a service of another type) based on the service type indication information. Then, the access network device may determine, based on the service type of the service and a preconfigured correspondence between a service type and a radio channel quality requirement, the radio channel quality requirement for executing the service by the UE. For another example, it is assumed that the radio channel quality requirement information of the service includes the coding information of the service. The access network device may determine, based on the coding information of the service, a radio channel quality requirement corresponding to the coding information of the service.

S402: The access network device receives the bearer setup request message from the core network device or the application function device.

For example, if the application function device sends the bearer setup request message to the access network device in Manner 1, the access network device may receive, by using the core network device, the bearer setup request message sent by the application function device; or if the application function device sends the bearer setup request message to the access network device in Manner 2, the access network device may directly receive, through the private interface between the application function device and the access network device, the bearer setup request message sent by the application function device.

S403: The access network device sets up a bearer for a service.

After receiving the bearer setup request message sent by the core network device or the application function device, the access network device may directly set up the bearer for the service.

Optionally, after receiving the bearer setup request message sent by the core network device or the application function device, the access network device may alternatively determine whether radio channel quality of a first cell of a first network in which the terminal is located meets the service requirement, and set up the bearer for the service when the radio channel quality of the first cell of the first network in which the terminal is located meets the service requirement. In other words, S403 in FIG. 4 may be replaced with S403'.

S403': The access network device sets up a bearer for a service when the access network device determines that radio channel quality of a first cell of a first network in which a terminal is located meets a service requirement.

The bearer is set up for the service when the radio channel quality of the first cell of the first network in which the terminal is located meets the service requirement, to ensure proper execution of the service after the bearer is set up.

For example, after receiving the bearer setup request message that carries the service requirement of the service, the access network device may obtain a radio channel requirement of the service based on the service requirement, and then compare the obtained radio channel requirement and the radio channel quality of the first cell, to determine whether the radio channel quality of the first cell meets the service requirement of the service.

For example, it is assumed that the service requirement of the service includes the service type indication information of the service. The access network device may determine the type of the service (for example, the VoLTE service, the video service, or the service of another type) based on the service type indication information. Then, the access network device may determine, based on the service type of the service and a preconfigured correspondence between a service type and a radio channel requirement, the radio channel requirement (the RSRP requirement, the RSRQ requirement, or the SINR requirement) of the service. For another example, it is assumed that the service requirement of the service includes the coding information of the service. The access network device may determine, based on the coding information of the service, a radio channel requirement corresponding to the coding information of the service.

It may be figured out that the access network device may determine, based on information that an uplink radio channel quality parameter and/or a downlink radio channel quality parameter of the first cell in which the terminal is located cannot meet the radio channel requirement of the service, that the radio channel quality of the first cell in which the terminal is located cannot meet the service requirement of the service.

For example, the uplink channel quality parameter and/or the downlink channel quality parameter may include at least one of an uplink RSRP and/or a downlink RSRP, an uplink SINR and/or a downlink SINR, and uplink RSRQ and/or downlink RSRQ. For example, if the uplink RSRP and/or the downlink RSRP are/is less than the RSRP requirement, the uplink RSRQ and/or the downlink RSRQ are/is less than the RSRQ requirement of the service, and the uplink SINR and/or the downlink SINR are/is less than the SINR requirement of the service, the access network device may determine that the radio channel quality of the first cell cannot meet the service requirement of the service.

S404: The access network device sends a bearer setup response message to the core network device or the application function device.

After setting up the bearer for the service, the access network device may send the bearer setup response message to the core network device or the application function device. The bearer setup response message is used to notify the core network device or the application function device that the access network device has set up the bearer for the service.

Radio channel quality of each cell of the network may change at any time. For example, radio channel quality of a cell in which the terminal is located may not meet the service requirement. In this case, after setting up the bearer and sending the bearer setup response message to the core network device or the application function device, the access network device may detect, in real time, whether radio channel quality that can be provided by the access network device for the terminal meets the service requirement. The method in this disclosure may further include S405.

S405: The access network device determines whether radio channel quality provided by the access network device meets the service requirement.

When the radio channel quality that can be provided by the access network device for the terminal does not meet the service requirement, S406 or S410 may continue to be performed.

S406: The access network device sends a bearer deletion request message to the core network device or the application function device.

The deletion request message requests the core network device or the application function device to delete the bearer that is set up above. When the radio channel quality that can be provided by the access network device for the terminal does not meet the service requirement, the service cannot be properly executed even by using the bearer, and therefore, the bearer may be deleted.

S407: The application function device receives the bearer deletion request message from the access network device or the core network device.

S408: The application function device deletes the bearer of the service.

When the access network device determines that the radio channel quality provided by the access network device does not meet the service requirement and the service is not a voice service, the access network device may not delete the bearer of the service, and continue providing the service for the terminal. The method in this disclosure may further include S409.

S409: The access network device continues providing the service for the terminal if the access network device determines that the service is not a voice service.

In this disclosure, the application function device may instruct, by using identification information such as first identification information, second identification information, or third identification information included in the service requirement, the access network device to send the bearer deletion request message to the core network device or the application function device when radio channel quality that is of a network or a cell and that is provided by the access network device does not meet the service requirement.

When the service requirement includes the first identification information, because the first identification information is used to instruct the access network device to send the bearer deletion request message to the core network device or the application function device when the radio channel quality of the first cell of the first network in which the terminal is located does not meet the service requirement, the access network device may send the bearer deletion request message to the core network device or the application function device when the access network device determines that the radio channel quality of the first cell of the first network in which the terminal is located does not meet the service requirement. S405 may be replaced with S405a.

S405a: If a service requirement includes first identification information, the access network device determines whether the radio channel quality of the first cell of the first network in which the terminal is located meets the service requirement.

After S405a is performed, if the access network device determines that the radio channel quality of the first cell does not meet the service requirement, S406 may continue to be performed.

When the service requirement includes the second identification information, because the second identification information is used to instruct the access network device to send the bearer deletion request message to the core network device or the application function device when radio channel quality of a second cell of the first network in which the terminal is located does not meet the service requirement, or neither the radio channel quality of the first cell nor radio channel quality of a second cell meets the service requirement, the access network device sends the bearer deletion request message to the core network device or the application function device when determining that the radio channel quality of the second cell does not meet the service requirement or that neither the radio channel quality of the first cell nor the radio channel quality of the second cell meets the service requirement. S405 may be replaced with S405b and S405c.

S405b: If the service requirement includes second identification information, the access network device determines whether radio channel quality of a second cell of the first network in which the terminal is located meets the service requirement.

After S405b is performed, if the access network device determines that the radio channel quality of the second cell does not meet the service requirement, S406 or S405c may continue to be performed.

S405c: The access network device determines whether the radio channel quality of the first cell of the first network in which the terminal is located meets the service requirement.

After S405c is performed, if the access network device determines that the radio channel quality of the first cell does not meet the service requirement, S406 may continue to be performed.

When the service requirement includes the third identification information, because the third identification information is used to instruct the access network device to send the bearer deletion request message to the core network device or the application function device when radio channel quality of a third cell of a second network in which the terminal is located does not meet the service requirement, or neither radio channel quality of a second cell nor radio channel quality of a third cell meets the service requirement, or none of the radio channel quality of the first cell, radio channel quality of a second cell, and radio channel quality of a third cell meets the service requirement, the access network device sends the bearer deletion request message to the core network device or the application function device when the access network device determines that the radio channel quality of the third cell does not meet the service requirement, or that neither the radio channel quality of the second cell nor the radio channel quality of the third cell meets the service requirement, or that none of the radio channel quality of the first cell, the radio channel quality of the second cell, and the radio channel quality of the third cell meets the service requirement. S405 may be replaced with S405d and S405c.

S405d: If the service requirement includes third identification information, the access network device determines whether radio channel quality of a third cell of a second network in which the terminal is located meets the service requirement.

When the radio channel quality of the third cell does not meet the service requirement, S406 may continue to be performed.

When the radio channel quality of the third cell does not meet the service requirement, the access network device may not perform S406, but continue to determine whether the radio channel quality of the first cell and/or the radio channel quality of the second cell meet/meets the service requirement, and perform S406 when the radio channel quality of the first cell and/or the radio channel quality of the second cell do/does not meet the service requirement.

In this disclosure, when radio channel quality of different cells (such as the first cell, the second cell, or the third cell) does not meet the service requirement, the access network device may send the bearer deletion request message to the core network device or the application function device based on the identification information included in the service requirement, to request the core network device or the application function device to delete the bearer of the service.

Further, to avoid an interruption of voice communication and impact on user experience due to deletion of a bearer of the voice service, when determining that the service is a voice service, the access network device does not send the bearer deletion request message to the core network device or the application function device even if the radio channel quality provided by the access network device does not meet the service requirement. After S404, the method in this disclosure may further include S410.

S410: The access network device does not send the bearer deletion request message to the core network device or the application function device if the access network device determines that the service is a voice service.

It should be emphasized that when the service is a voice service, the access network device does not send the bearer deletion request message to the core network device or the application function device regardless of whether the radio channel quality provided by the access network device meets the service requirement. In other words, when the service is a voice service, S406 to S408 may not be performed.

According to the service communication method provided in this disclosure, after receiving the bearer setup request message, the access network device may directly set up the bearer (in other words, allocate a radio resource) for the terminal. However, when the radio channel quality provided by the access network device does not meet the service requirement, the access network device may send the bearer deletion request message to the application function device or the core network device in a timely manner, to delete the bearer that is set up for the service. After the bearer of the service is deleted, a radio resource occupied by the service can be released, so that more radio resources can serve another low-bearer service (namely, a service with a relatively low radio channel quality requirement), and proper execution of the another service can be ensured. For example, when the access network device provides radio resources for both the voice service and the video service, a service requirement (namely, a radio channel quality requirement) of the voice service is lower than a service requirement of the video service. To ensure proper execution of the voice service, the access network device may delete a bearer that is set up for the video service, in other words, delete a radio resource allocated to the video service.

After receiving the bearer deletion request message from the access network device or the core network device, the application function device may send a bearer update request to the access network device, to request the access network device to set up a bearer for the service again. The method in this disclosure may further include S411-S415.

S411: The application function device sends a bearer update request to the access network device, where the bearer update request is used to request the access network device to set up a bearer for the service again.

S412: The access network device receives the bearer update request from the application function device.

S413: The access network device sets up the bearer for the service again.

S414: The access network device sends a bearer update response to the application function device.

The bearer update response is used to notify the application function device that the access network device has set up the bearer for the service again.

S415: The application function device receives the bearer update response from the access network device.

The bearer update response is used to notify the application function device that the access network device has set up the bearer for the service again. After setting up the bearer for the service again, the access network device may further continue to determine whether the radio channel quality provided by the access network device meets the service requirement, and send the bearer deletion request message to the core network device or the application function device when the radio channel quality provided by the access network device does not meet the service requirement. In other words, after S415, the method in this disclosure may further include S405 to S411.

Figure 5A:
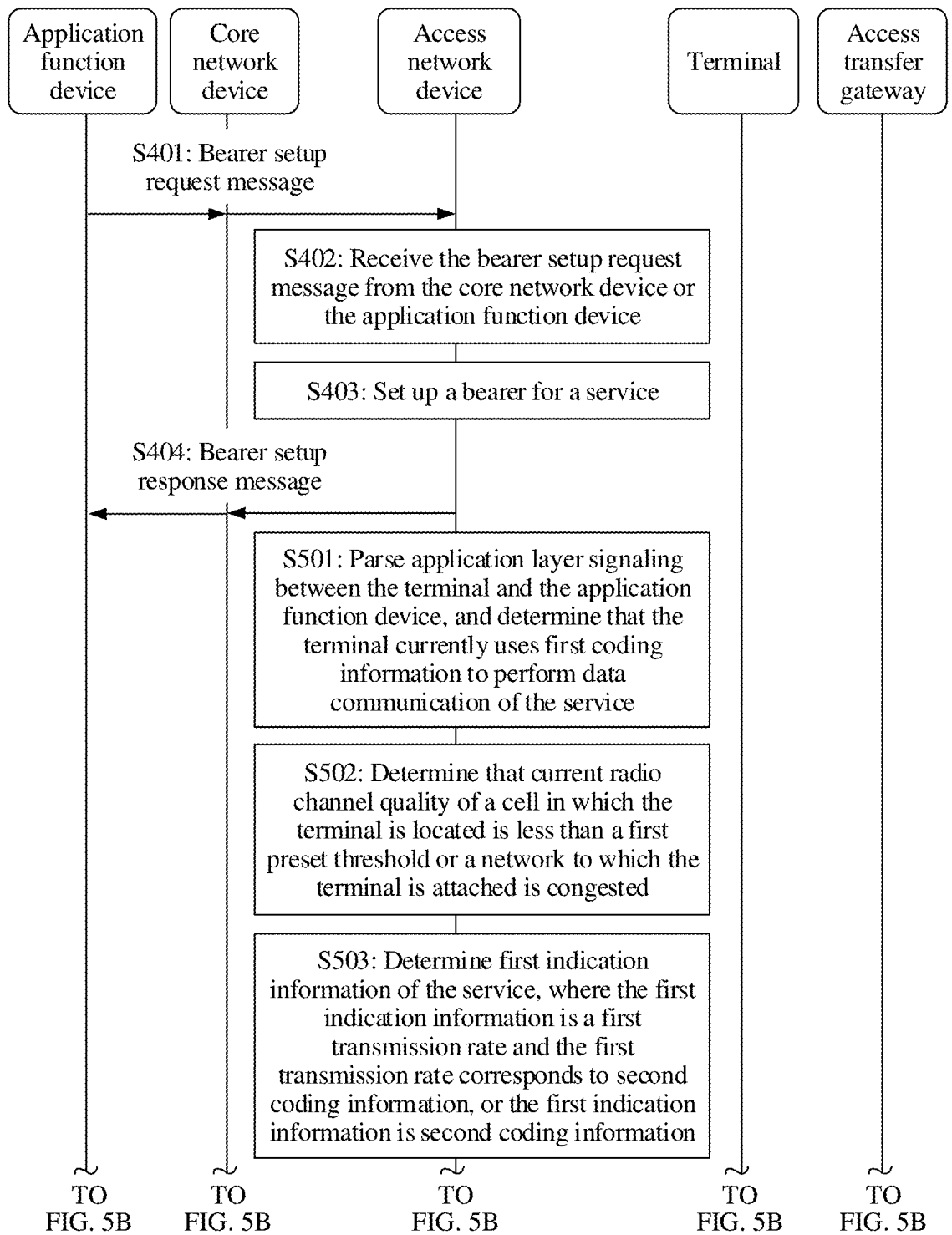
FIG. 5A-FIG. 5C are a second flowchart of a service communication method according to an embodiment of this disclosure.
Figure 5B:
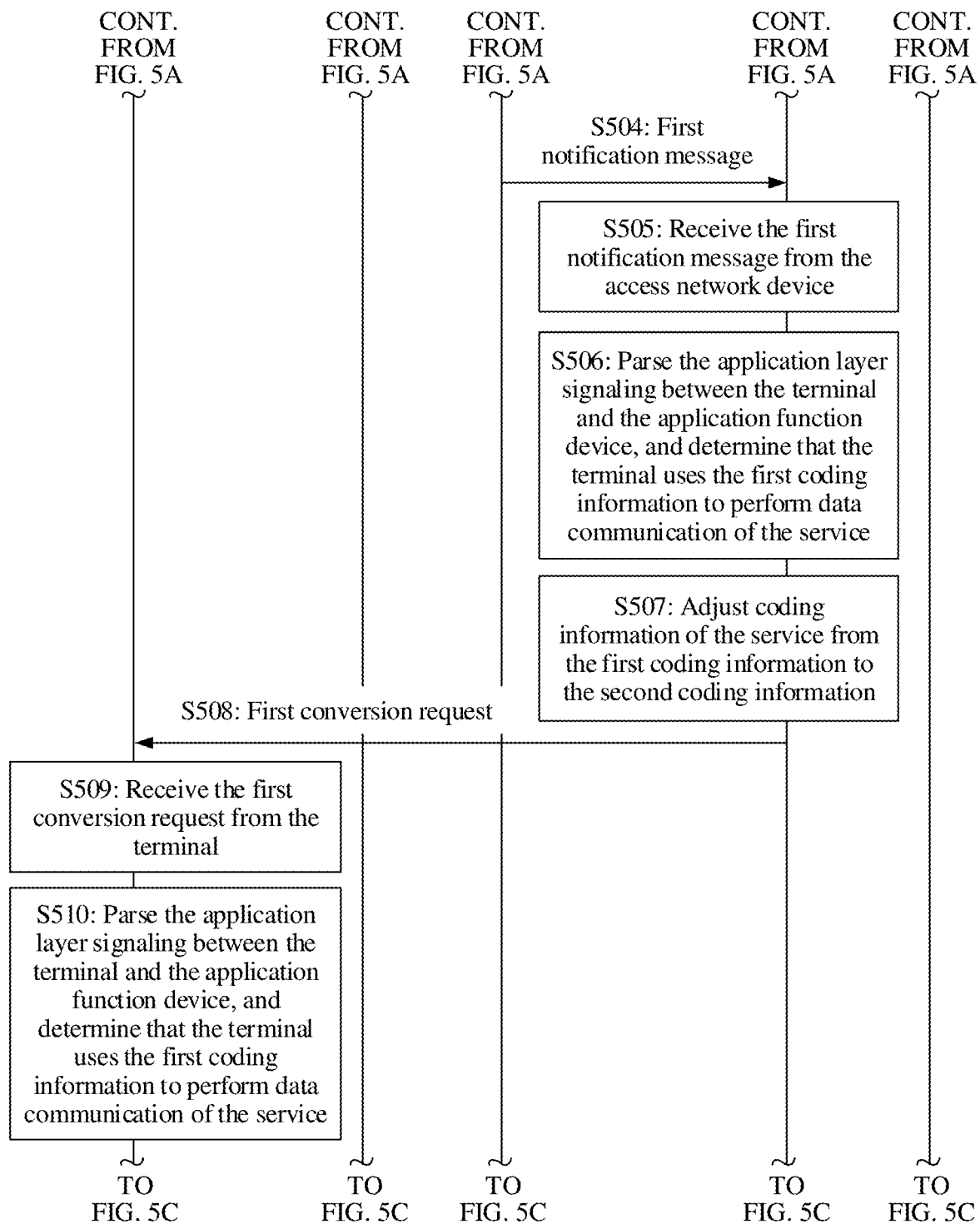
Figure 5C:
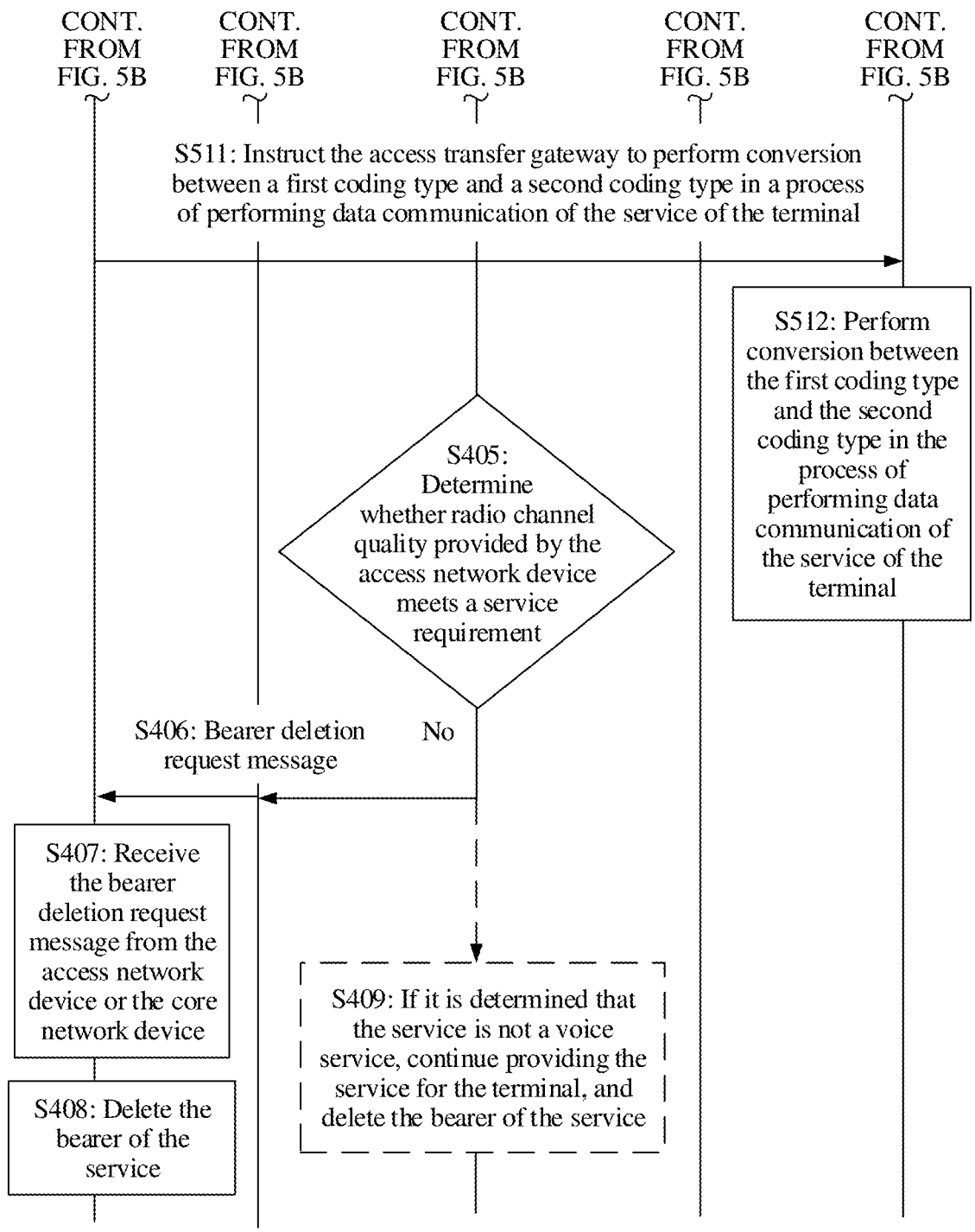
Figure 6A:
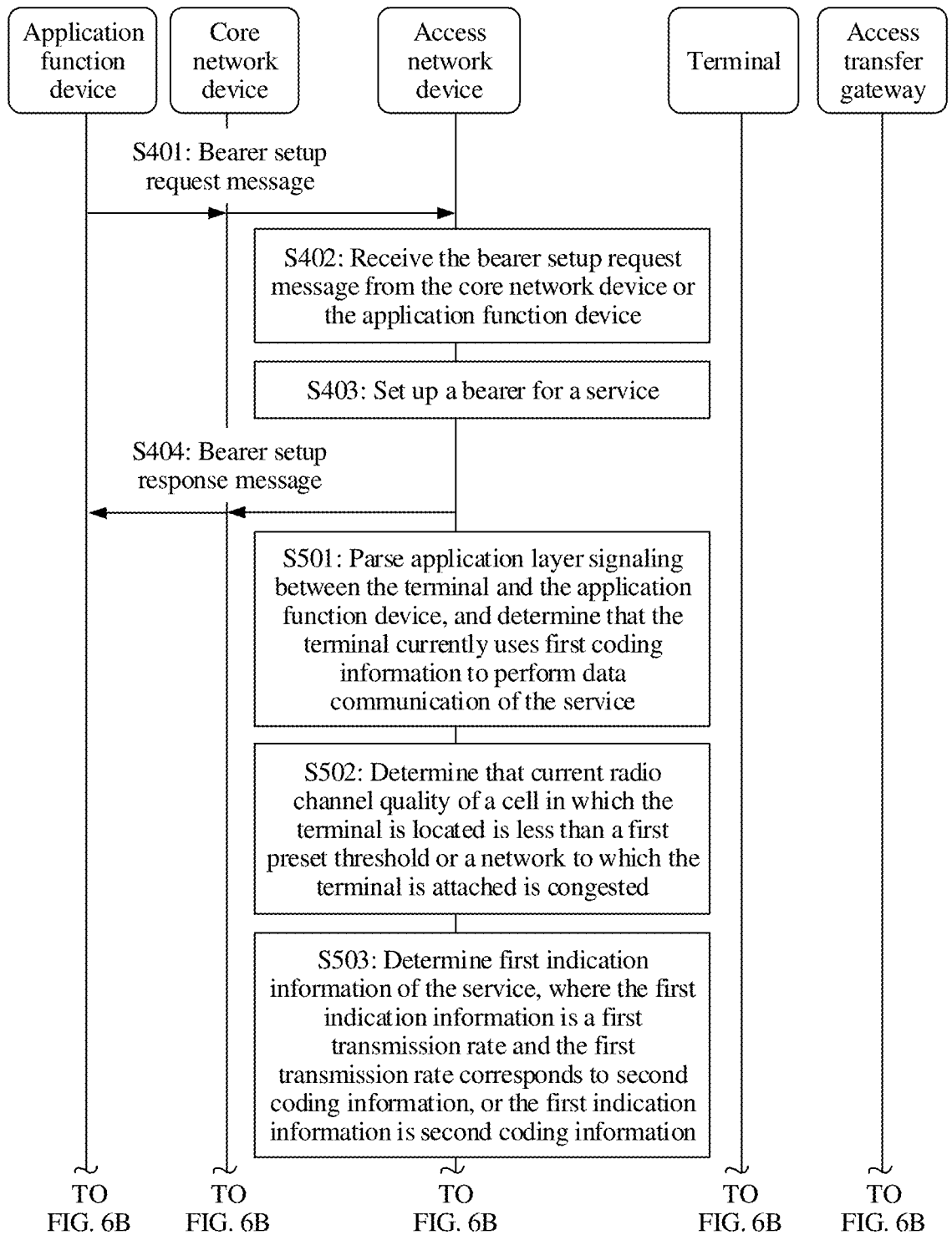
FIG. 6A-FIG. 6D are a third flowchart of a service communication method according to an embodiment of this disclosure.
Figure 6B:
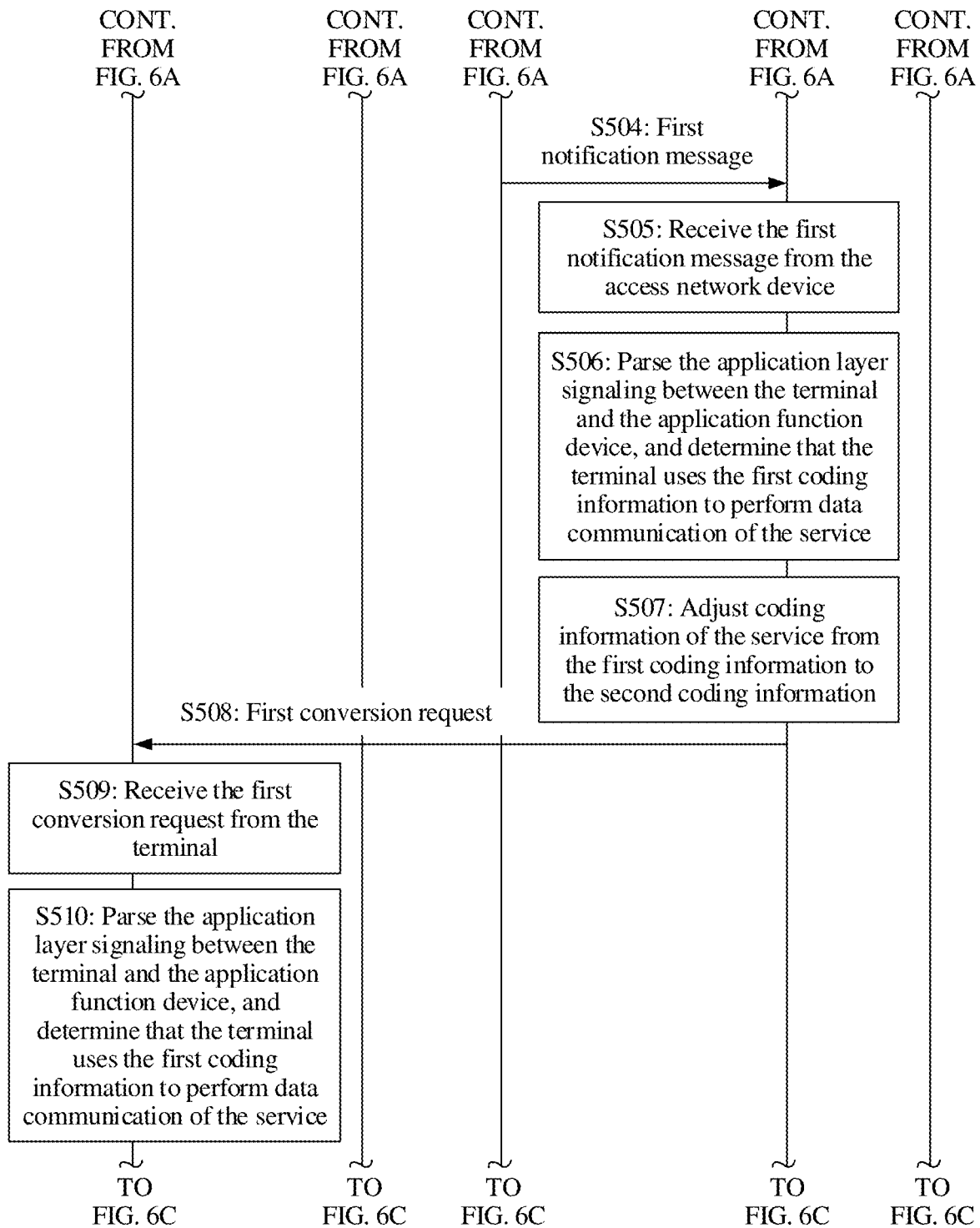
Figure 6C:
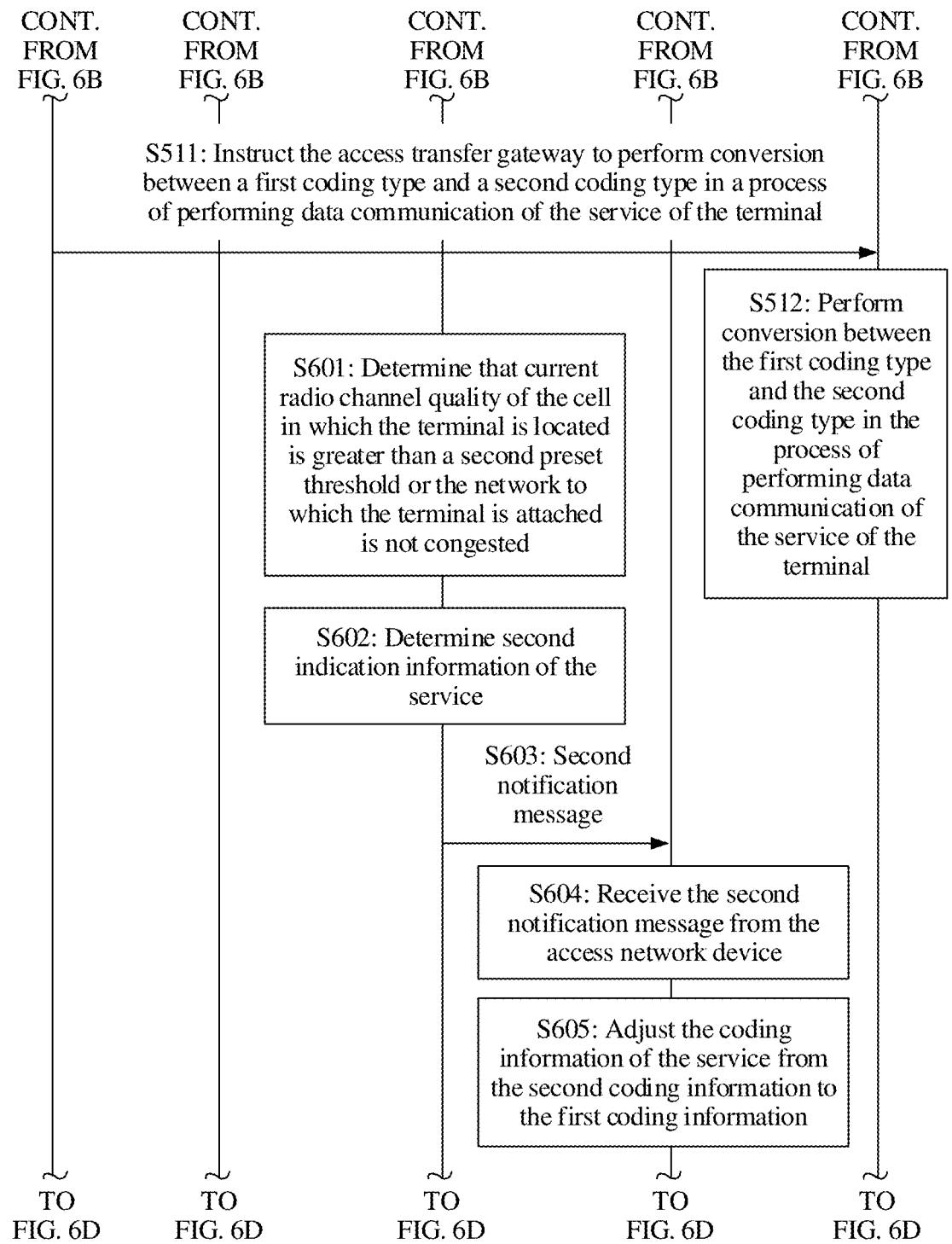
Figure 6D:
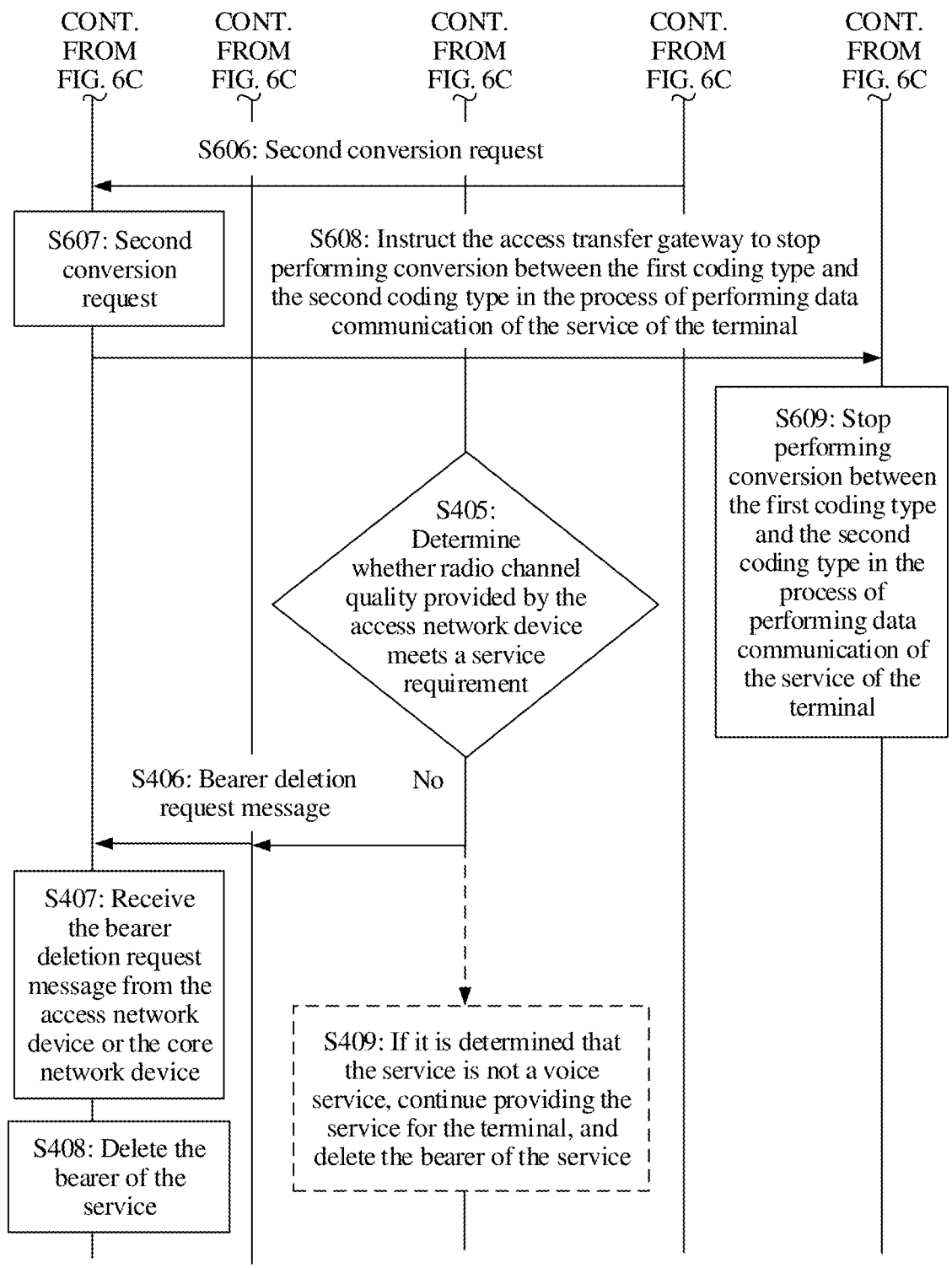

Further, after setting up the bearer for the service of the terminal, radio channel quality of each cell in a network may change at any time due to network instability. In this case, the access network device may not delete the bearer of the service. Instead, to adapt to a change of the radio channel quality, coding information of the service is adjusted, to ensure proper execution of the service. As shown in FIG. 5A-FIG. 5C, the method in this disclosure may further include S501-S512 between S404 and S405 that are shown in FIG. 4.

S501: The access network device parses application layer signaling between the terminal and the application function device, and determines that the terminal currently uses first coding information to perform data communication of the service.

The application layer signaling may be a real-time transport protocol (RTP) stream. The first coding information includes a first coding type and a first coding rate. For example, the first coding type may be an AMR (namely, an AMR-NB), and the first coding rate may be any coding rate corresponding to the AMR shown in FIG. 3.

S502: The access network device determines that current radio channel quality of a cell in which the terminal is located is less than a first preset threshold or that a network to which the terminal is attached is congested.

If the access network device determines that the current radio channel quality of the cell in which the terminal is located is less than the first preset threshold or that the network to which the terminal is attached is congested, it may indicate that if the terminal uses current coding information (the first coding information such as the AMR) to perform data communication of the service, a problem that the service cannot be properly executed or service execution brings relatively poor user experience may be caused. In this case, the access network device may instruct the terminal to adjust the coding information used for performing data communication of the service. In addition, before instructing the terminal to adjust the coding information, the access network device may determine coding information (namely, second coding information such as an EVS) that can ensure that the service is properly executed or service execution can bring relatively good user experience. After S502, the method in this disclosure may further include S503.

S503: The access network device determines first indication information of the service, where the first indication information is a first transmission rate and the first transmission rate corresponds to second coding information, or the first indication information is second coding information.

The second coding information may include a second coding type and a second coding rate. For example, the second coding type may be an EVS, and the second coding rate may be any coding rate corresponding to the EVS shown in FIG. 3.

S504: The access network device sends a first notification message to the terminal.

The first notification message carries the first indication information, and the first notification message is used to instruct the terminal to adjust the coding information of the service from the first coding information to the second coding information.

S505: The terminal receives the first notification message from the access network device.

Before adjusting the coding information of the service from the first coding information to the second coding information, the terminal may determine whether the terminal uses the first coding information to perform data communication of the service. The method in this disclosure may further include S506.

S506: The terminal parses the application layer signaling between the terminal and the application function device, and determines that the terminal uses the first coding information to perform data communication of the service.

The application layer signaling may be an RTP stream.

S507: The terminal adjusts coding information of the service from the first coding information to the second coding information.

After adjusting the coding information of the service from the first coding information to the second coding information, the terminal (for example, the terminal of the calling party) may use the second coding information to perform data communication of the service with a peer terminal (for example, the terminal of the called party). However, the peer terminal (for example, the terminal of the called party) may not support a coding manner of the second coding information. In this case, the terminal may instruct the application function device to perform conversion between the first coding type and the second coding type in a process of performing data communication of the service. In this way, even if the peer terminal (for example, the terminal of the called party) does not support the coding manner of the second coding information, data communication between the terminal and the peer terminal is not affected. The method in this disclosure may further include S508.

S508: The terminal sends a first conversion request to the application function device.

The first conversion request carries the second coding information, and the first conversion request is used to instruct the application function device to perform conversion between the first coding type and the second coding type in the process of performing data communication of the service.

S509: The application function device receives the first conversion request from the terminal.

S510: The application function device parses the application layer signaling between the terminal and the application function device, and determines that the terminal uses the first coding information to perform data communication of the service.

S511: The application function device instructs an access transfer gateway to perform conversion between a first coding type and a second coding type in a process of performing data communication of the service of the terminal.

S512: The access transfer gateway performs conversion between the first coding type and the second coding type in the process of performing data communication of the service of the terminal.

According to the service communication method provided in this disclosure, when the radio channel quality provided by the access network device does not meet the service requirement, the access network device may not delete the bearer that is set up for the service, but instruct the terminal to adjust the coding information used for performing data communication of the service, for example, instruct the terminal to adjust the coding information of the service from the AMR to the EVS. Different coding information includes different coding types and coding rates. For example, the EVS may provide a higher coding rate than the AMR. In this case, a manner of performing data communication of the service can be improved, and it is ensured that the service is properly executed or service execution can bring relatively good user experience.

Further, because the radio channel quality of each cell in the network may change at any time, after the coding information for performing data communication of the service is adjusted from the first coding information to the second coding information, the radio channel quality of the cell in which the terminal is located may be improved. In this case, the access network device may instruct the terminal to adjust the coding information for performing data communication of the service from the second coding information back to the first coding information. As shown in FIG. 6A-FIG. 6D, after S512, the method in this disclosure may further include S601-S609.

S601: The access network device determines that current radio channel quality of the cell in which the terminal is located is greater than a second preset threshold or that the network to which the terminal is attached is not congested.

Second current network status information is that the access network device determines that the current radio channel quality of the cell in which the terminal is located is greater than the second preset threshold or that the network to which the terminal is attached is not congested.

S602: The access network device determines second indication information of the service.

The second indication information is a second transmission rate, and the second transmission rate corresponds to the second coding information. Alternatively, the second indication information is the second coding information.

S603: The access network device sends a second notification message to the terminal.

The second notification message carries the second indication information, and the second notification message is used to instruct the terminal to adjust the coding information of the service from the second coding information to the first coding information.

S604: The terminal receives the second notification message from the access network device.

S605: The terminal adjusts the coding information of the service from the second coding information to the first coding information.

S606: The terminal sends a second conversion request to the application function device.

The second conversion request carries the first coding information, and the second conversion request is used to instruct the application function device to stop performing conversion between the first coding type and the second coding type in the process of performing data communication of the service.

S607: The application function device receives the second conversion request from the terminal.

S608: The application function device instructs the access transfer gateway to stop performing conversion between the first coding type and the second coding type in the process of performing data communication of the service of the terminal.

S609: The access transfer gateway stops performing conversion between the first coding type and the second coding type in the process of performing data communication of the service of the terminal.

According to the service communication method provided in this disclosure, when the current radio channel quality of the cell in which the terminal is located is greater than the second preset threshold or the network to which the terminal is attached is not congested, the access network device may instruct the terminal to adjust the coding information of the service from the second coding information back to the first coding information. In this way, the application function device does not need to frequently perform conversion between the first coding type and the second coding type in the process of performing data communication of the service of the terminal, to simplify a data communication procedure of the service of the terminal and improve data communication efficiency.

The foregoing mainly describes the solutions of the embodiments of this disclosure from a perspective of interaction between devices such as the access network device, the application function device, the core network device, and the terminal. To implement the foregoing functions, the access network device, the terminal, and the application function device include hardware structures and/or software modules corresponding to the functions. A person skilled in the art should easily learn that the access network device, the application function device, and algorithm operations in the examples described with reference to the embodiments disclosed in this specification can be implemented by hardware or a combination of hardware and computer software in this disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In the embodiments of this disclosure, the devices such as the access network device, the application function device, the core network device, and the terminal may be divided based on the foregoing method examples. For example, each module or unit may be obtained through division based on a corresponding function, or two or more functions may be integrated into one processing module. The foregoing integrated module may be implemented in a form of hardware, or may be implemented in a form of a software module or unit. In the embodiments of this disclosure, module or unit division is an example, and is merely a logical function division. In actual implementation, another division manner may be used.

Figure 7:
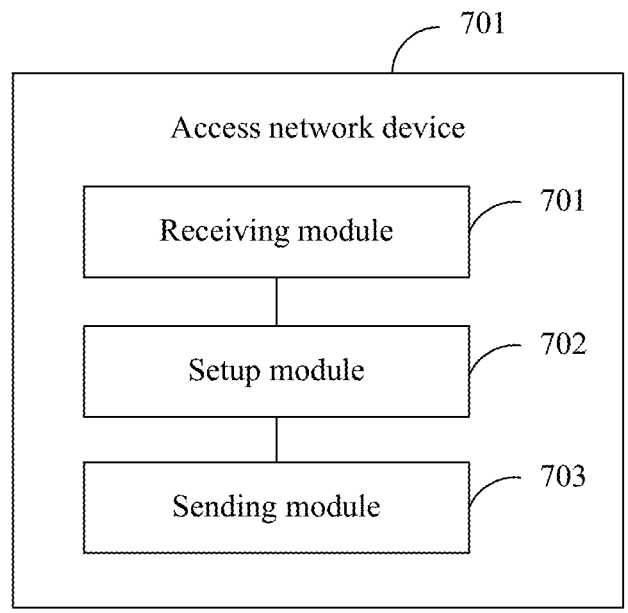
FIG. 7 is a first schematic structural diagram of an access network device according to an embodiment of this disclosure.

FIG. 7 is a schematic structural diagram of an access network device in the foregoing embodiments. The access network device 700 includes a receiving module 701, a setup module 702, and a sending module 703.

The receiving module 701 is configured to support S402 and S412 in the method embodiment, and/or is configured to perform another process of the technology described in this specification. The setup module 702 is configured to support S403, S403', and S413 in the method embodiment, and/or is configured to perform another process of the technology described in this specification. The sending module 703 is configured to support S404 to S406, S405a to S405d, S414, S504, and S603 in the method embodiment, and/or is configured to perform another process of the technology described in this specification.

Further, this disclosure further provides an access network device 700. The access network device 700 may include a receiving module 701, a setup module 702, a sending module 703, and a service processing module. The service processing module is configured to support S409 in the method embodiment, and/or is configured to perform another process of the technology described in this specification.

Figure 8:
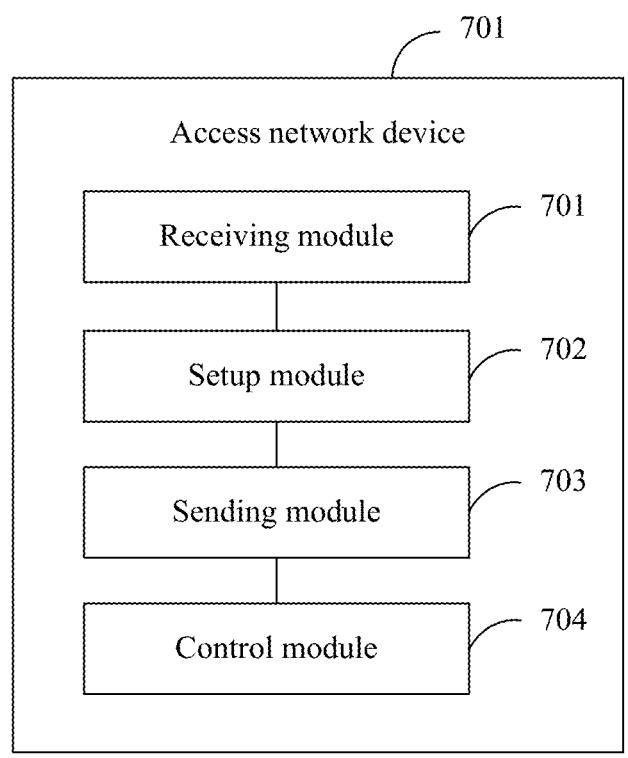
FIG. 8 is a second schematic structural diagram of an access network device according to an embodiment of this disclosure.

Further, as shown in FIG. 8, the access network device 700 may further include a control module 704. The control module 704 is configured to support S410 in the method embodiment, and/or is configured to perform another process of the technology described in this specification.

Figure 9:
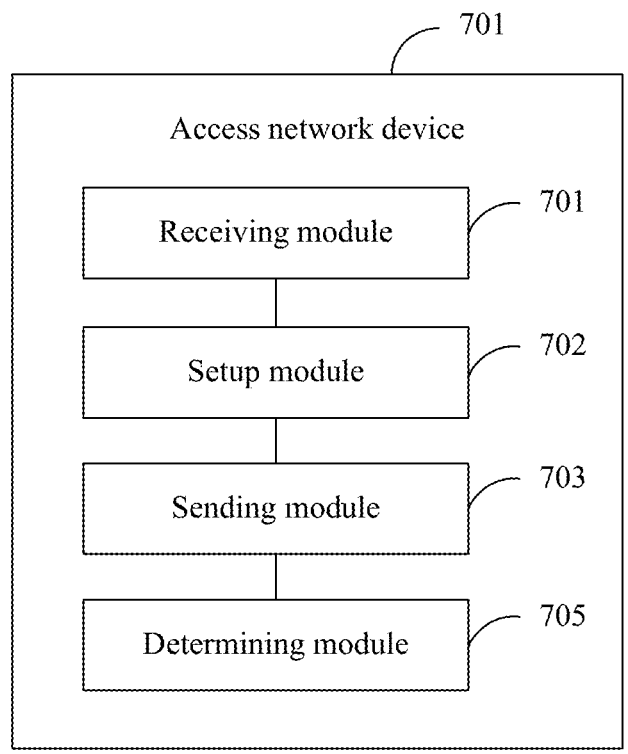
FIG. 9 is a third schematic structural diagram of an access network device according to an embodiment of this disclosure.

Further, as shown in FIG. 9, the access network device 700 may further include a determining module 705. The determining module 705 is configured to support S501, S502, S503, S601, and S602 in the method embodiment, and/or is configured to perform another process of the technology described in this specification.

The access network device 700 includes but is not limited to the modules listed above. For example, the access network device 700 may further include a deletion module configured to delete a bearer that is set up by the setup module 702 for a terminal. In addition, functions that can be implemented by the foregoing modules include but are not limited to functions corresponding to the method operations in the foregoing example. For another unit of the access network device 700 and a detailed description of each unit of the access network device 700, refer to a detailed description of a method operation corresponding to the unit. Details are not described herein again in this embodiment of this disclosure.

When an integrated unit is used, the determining module 705, the control module 704, the service processing module, the setup module 702, and the like may be integrated into one processing unit for implementation. The processing unit may be a processor or a controller, for example, may be a CPU, a general purpose processor, a digital signal processor (DSP), an application-specific integrated circuit (ASIC), a field programmable gate array (FPGA) or another programmable logic device, a transistor logic device, a hardware component, or any combination thereof. The processing unit may implement or execute various illustrative logical blocks, modules, and circuits described with reference to content disclosed in this disclosure. The processing unit may be a combination implementing a computing function, for example, a combination of one or more microprocessors, or a combination of a DSP and a microprocessor. The receiving module 701 and the sending module 703 may be integrated into one communications unit for implementation. The communications unit may be a communications interface, a transceiver circuit, a transceiver, or the like.

Figure 10:
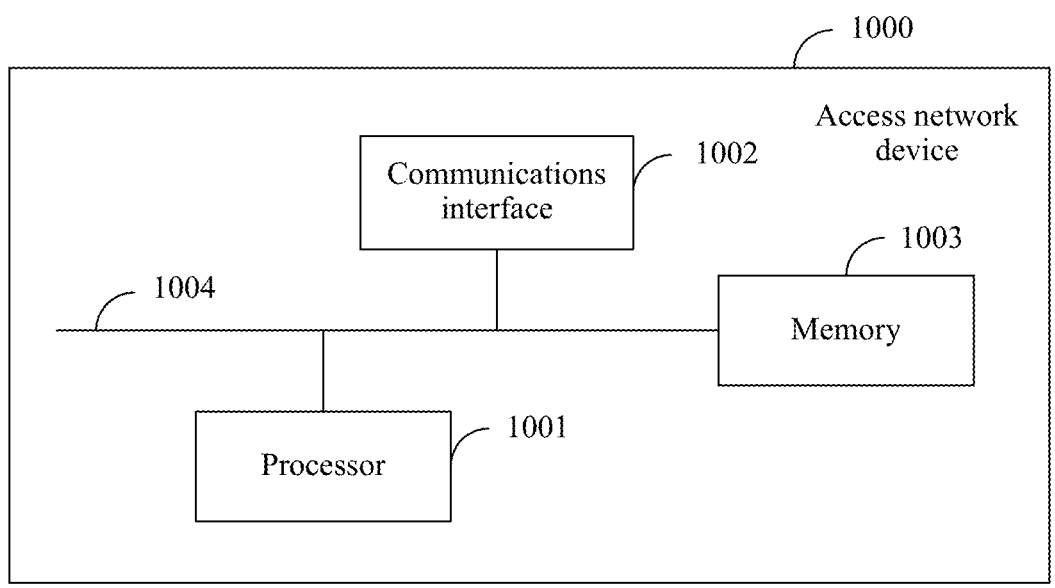
FIG. 10 is a fourth schematic structural diagram of an access network device according to an embodiment of this disclosure.

When the processing unit is a processor and the communications unit is a communications interface, the access network device 700 in this embodiment of this disclosure may be an access network device 1000 shown in FIG. 10. As shown in FIG. 10, the access network device 1000 includes a processor 1001, a communications interface 1002, a memory 1003, and a bus 1004. The processor 1001, the communications interface 1002, and the memory 1003 are connected to each other by using the bus 1004. The memory is configured to store computer program code, and the computer program code includes an instruction. When the processor 1001 of the access network device 1000 executes the instruction, the access network device 1000 performs related method operations in any one of the accompanying drawings in FIG. 4 to FIG. 6A-FIG. 6D, and interacts with devices such as an application function device, a core network device, and a terminal to implement the service communication method in the foregoing embodiment.

The bus 1004 may be a peripheral component interconnect (PCI) bus, an extended industry standard architecture (EISA) bus, or the like. The bus 1004 may be classified into an address bus, a data bus, a control bus, and the like. For ease of representation, only one thick line is used to represent the bus in FIG. 10, but this does not mean that there is only one bus or only one type of bus.

This embodiment of this disclosure further provides a computer storage medium, and the computer storage medium stores computer program code. When the processor 1001 of the access network device 1000 executes the computer program code, the access network device 1000 performs related method operations in any one of the accompanying drawings in FIG. 4 to FIG. 6A-FIG. 6D, and interacts with devices such as an application function device to implement the service communication method in the foregoing embodiment.

For detailed descriptions of units in the access network device provided in this embodiment of this disclosure and technical effects obtained after the units or modules perform related method operations in any one of the accompanying drawings in FIG. 4 to FIG. 6A-FIG. 6D, refer to the related descriptions in the method embodiment of this disclosure. Details are not described herein again.

Figure 11:
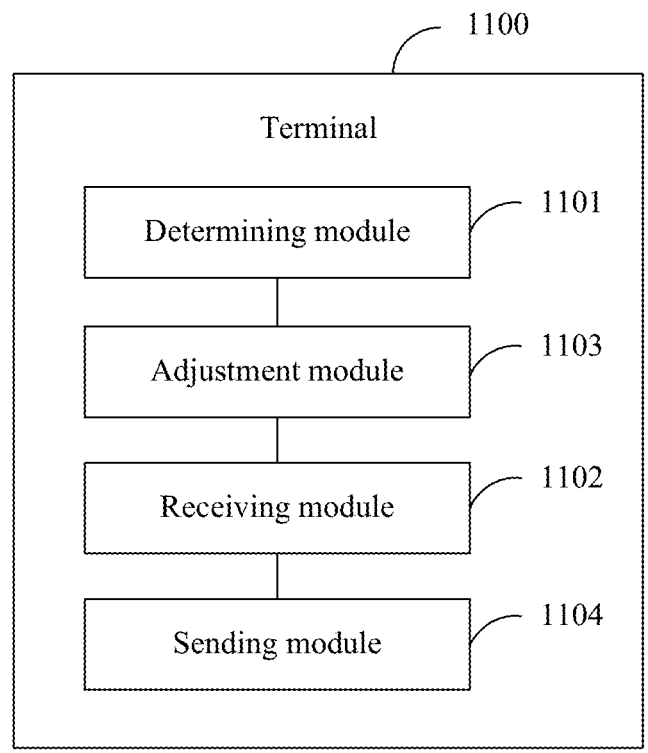
FIG. 11 is a first schematic structural diagram of a terminal according to an embodiment of this disclosure.

FIG. 11 is a schematic structural diagram of a terminal in the foregoing embodiments. The terminal 1100 includes a determining module 1101, a receiving module 1102, and an adjustment module 1103.

The determining module 1101 is configured to support S506 in the method embodiment, and/or is configured to perform another process of the technology described in this specification. The receiving module 1102 is configured to support S505 and S604 in the method embodiment, and/or is configured to perform another process of the technology described in this specification. The adjustment module 1103 is configured to support S507 and S605 in the method embodiment, and/or is configured to perform another process of the technology described in this specification.

As shown in FIG. 11, the terminal 1100 may further include a sending module 1104. The sending module 1104 is configured to support S508 and S606 in the method embodiment, and/or is configured to perform another process of the technology described in this specification.

The terminal 1100 includes but is not limited to the modules listed above. In addition, functions that can be specifically implemented by the foregoing modules include but are not limited to functions corresponding to the method operations in the foregoing example. For another unit of the terminal 1100 and a detailed description of each unit of the terminal 1100, refer to a detailed description of a method operation corresponding to the unit. Details are not described herein again in this embodiment of this disclosure.

When an integrated unit is used, the determining module 1101, the adjustment module 1103, and the like may be integrated into one processing unit for implementation. The processing unit may be a processor or a controller, for example, may be a CPU, a general purpose processor, a DSP, an ASIC, an FPGA or another programmable logical device, a transistor logical device, a hardware component, or any combination thereof. The processing unit may implement or execute various illustrative logical blocks, modules, and circuits described with reference to content disclosed in this disclosure. The processing unit may be a combination implementing a computing function, for example, a combination of one or more microprocessors, or a combination of a DSP and a microprocessor. The receiving module 1102 and the sending module 1104 may be integrated into one communications unit for implementation. The communications unit may be a communications interface, a transceiver circuit, a transceiver, or the like.

Figure 12:
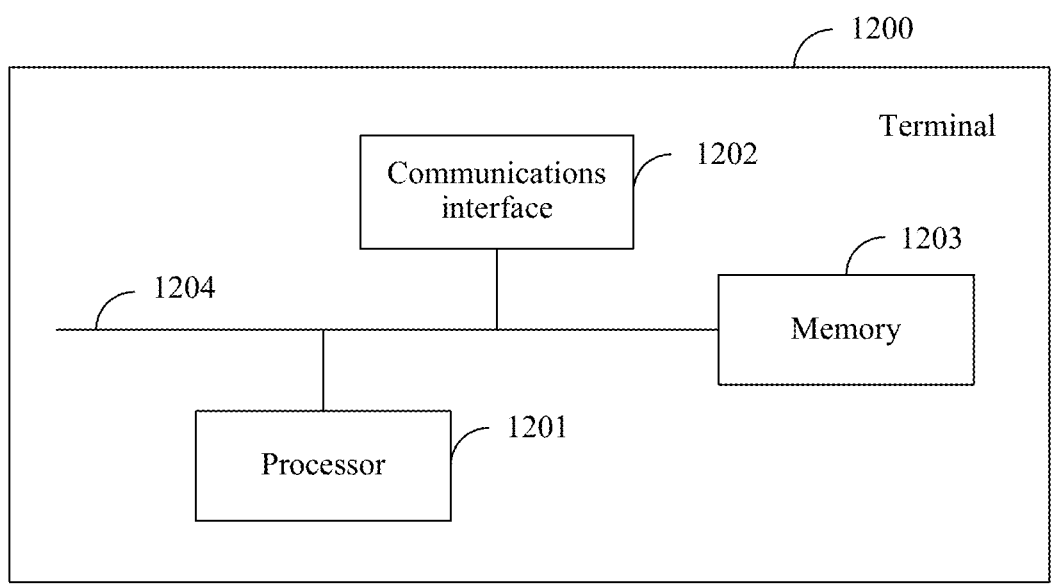
FIG. 12 is a second schematic structural diagram of a terminal according to an embodiment of this disclosure.

When the processing unit is a processor and the communications unit is a communications interface, the terminal 1100 in this embodiment of this disclosure may be a terminal 1200 shown in FIG. 12. As shown in FIG. 12, the terminal 1200 includes a processor 1201, a communications interface 1202, a memory 1203, and a bus 1204. The processor 1201, the communications interface 1202, and the memory 1203 are connected to each other by using the bus 1204. The memory is configured to store computer program code, and the computer program code includes an instruction. When the processor 1201 of the terminal 1200 executes the instruction, the terminal 1200 performs related method operations in any one of the accompanying drawings in FIG. 4 to FIG. 6A-FIG. 6D, and interacts with devices such as an application function device, a core network device, and an access network device to implement the service communication method in the foregoing embodiment.

The bus 1204 may be a PCI bus, an EISA bus, or the like. The bus 1204 may be classified into an address bus, a data bus, a control bus, and the like. For ease of representation, only one thick line is used to represent the bus in FIG. 12, but this does not mean that there is only one bus or only one type of bus.

This embodiment of this disclosure further provides a computer storage medium, and the computer storage medium stores computer program code. When the processor 1201 of the terminal 1200 executes the computer program code, the terminal 1200 performs related method operations in any one of the accompanying drawings in FIG. 4 to FIG. 6A-FIG. 6D, and interacts with devices such as an application function device to implement the service communication method in the foregoing embodiment.

For detailed descriptions of units in the terminal 1200 provided in this embodiment of this disclosure and technical effects obtained after the units or modules perform related method operations in any one of the accompanying drawings in FIG. 4 to FIG. 6A-FIG. 6D, refer to the related descriptions in the method embodiment of this disclosure. Details are not described herein again.

Figure 13:
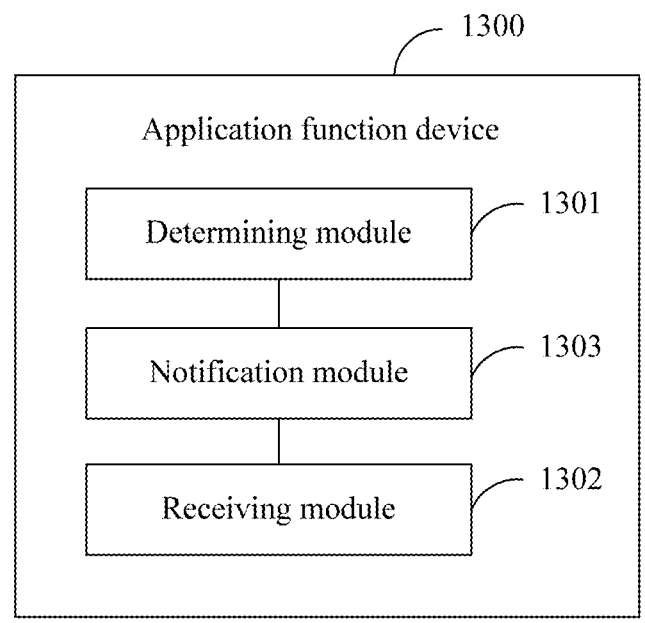
FIG. 13 is a first schematic structural diagram of an application function device according to an embodiment of this disclosure.

FIG. 13 is a schematic structural diagram of an application function device in the foregoing embodiments. The application function device 1300 includes a determining module 1301, a receiving module 1302, and a notification module 1303.

The determining module 1301 is configured to support S510 in the method embodiment, and/or is configured to perform another process of the technology described in this specification. The receiving module 1302 is configured to support S407, S509, S607, and S415 in the method embodiment, and/or is configured to perform another process of the technology described in this specification. The notification module 1303 is configured to support S408, S511, and S608 in the method embodiment.

The application function device 1300 includes but is not limited to the modules listed above. For example, the application function device 1300 may further include a conversion module configured to convert coding information, and a sending module configured to send data. The sending module is configured to support S401 in the method embodiment, and/or is configured to perform another process of the technology described in this specification. In addition, functions that can be implemented by the foregoing modules include but are not limited to functions corresponding to the method operations in the foregoing example. For another unit of the application function device 1300 and a detailed description of each unit of the application function device 1300, refer to a detailed description of a method operation corresponding to the unit. Details are not described herein again in this embodiment of this disclosure.

When an integrated unit is used, modules such as the determining module 1301, the notification module 1303, and the conversion module may be integrated into one processing unit for implementation. The processing unit may be a processor or a controller, for example, may be a CPU, a general purpose processor, a DSP, an ASIC, an FPGA or another programmable logical device, a transistor logical device, a hardware component, or any combination thereof. The processing unit may implement or execute various illustrative logical blocks, modules, and circuits described with reference to content disclosed in this disclosure. The processing unit may be a combination implementing a computing function, for example, a combination of one or more microprocessors, or a combination of a DSP and a microprocessor. The sending module and the receiving module 1302 may be integrated into one communications unit for implementation. The communications unit may be a communications interface, a transceiver circuit, a transceiver, or the like.

Figure 14:
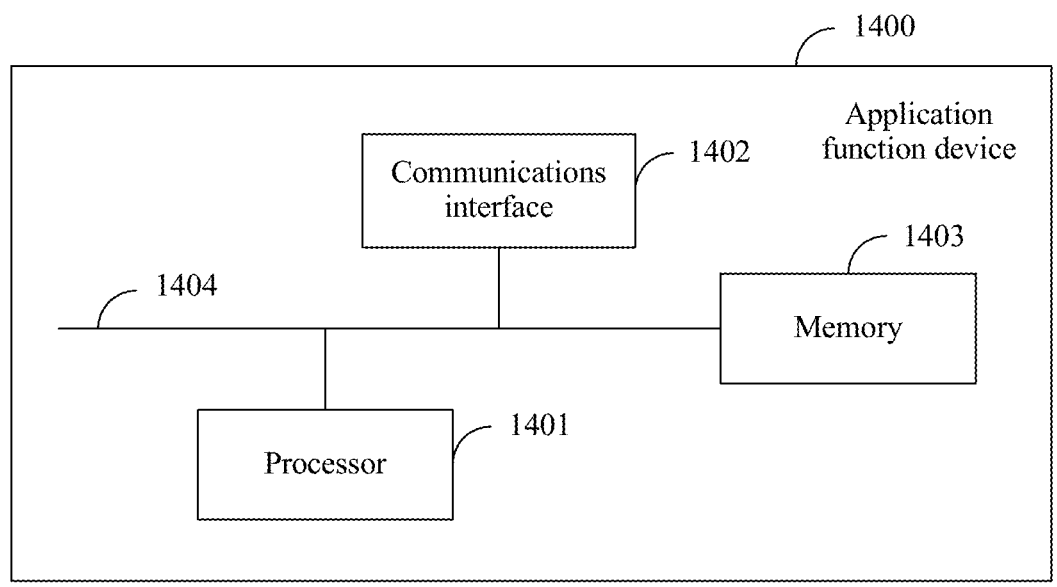
FIG. 14 is a second schematic structural diagram of an application function device according to an embodiment of this disclosure.

When the processing unit is a processor and the communications unit is a communications interface, the application function device 1300 in this embodiment of this disclosure may be an application function device 1400 shown in FIG. 14. As shown in FIG. 14, the application function device 1400 includes a processor 1401, a communications interface 1402, a memory 1403, and a bus 1404. The processor 1401, the communications interface 1402, and the memory 1403 are connected to each other by using the bus 1404. The memory is configured to store computer program code, and the computer program code includes an instruction. When the processor 1401 of the application function device 1400 executes the instruction, the application function device 1400 performs related method operations in any one of the accompanying drawings in FIG. 4 to FIG. 6A-FIG. 6D, and interacts with devices such as a terminal, a core network device, and an access network device to implement the service communication method in the foregoing embodiment.

The bus 1404 may be a PCI bus, an EISA bus, or the like. The bus 1404 may be classified into an address bus, a data bus, a control bus, and the like. For ease of representation, only one thick line is used to represent the bus in FIG. 14, but this does not mean that there is only one bus or only one type of bus.

This embodiment of this disclosure further provides a computer storage medium, and the computer storage medium stores computer program code. When the processor 1401 of the application function device 1400 executes the computer program code, the application function device 1400 performs related method operations in any one of the accompanying drawings in FIG. 4 to FIG. 6A-FIG. 6D, and interacts with devices such as an access network device and a terminal to implement the service communication method in the foregoing embodiment.

For detailed descriptions of units in the application function device 1400 provided in this embodiment of this disclosure and technical effects obtained after the units or modules perform related method operations in any one of the accompanying drawings in FIG. 4 to FIG. 6A-FIG. 6D, refer to the related descriptions in the method embodiment of this disclosure. Details are not described herein again.

Based on the foregoing descriptions of the implementations, a person skilled in the art may clearly understand that for the purpose of convenient and brief description, the foregoing function module division is used as an example for illustration. In actual application, the foregoing functions can be allocated to different modules and implemented based on a requirement. In other words, an inner structure of an apparatus is divided into different function modules to implement all or some of the foregoing described functions. For a detailed working process of the foregoing system, apparatus, and unit, refer to a corresponding process in the method embodiment. Details are not described herein again.

In the several embodiments provided in this disclosure, one of skill in the art understands that the disclosed system, apparatus, and method may be implemented in other manners. For example, the described apparatus embodiments are merely examples. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of this disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the operations of the method described in the embodiments of this disclosure. The foregoing storage medium includes any medium that can store program code, such as a flash memory, a removable hard disk, a read-only memory, a random access memory, a magnetic disk, or an optical disc.

The foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. A service communication method, comprising:

receiving, by an access network device from a core network device, a bearer setup request message for setting up a service for a terminal, wherein the bearer setup request message requests the access network device to set up a bearer for the service, the bearer setup request message carries a service requirement of the service, and the service requirement is used to indicate, to the access network device, a radio channel quality requirement for executing the service by the terminal;

setting up, by the access network device, the bearer for the service;

sending, by the access network device, a bearer setup response message to the core network device, wherein the bearer setup response message is used to notify the core network device that the access network device has set up the bearer for the service; and sending, by the access network device, a bearer deletion request message to the core network device when the access network device determines that radio channel quality provided by the access network device does not meet the service requirement, wherein the deletion request message requests the core network device to delete the bearer, including:

sending, by the access network device, the bearer deletion request message to the core network device when the access network device determines that a radio channel quality of a first cell of a first network in which the terminal is located does not meet the service requirement, and the service requirement comprises first identification information, wherein the first identification information is used to instruct the access network device to send the bearer deletion request message to the core network device when the radio channel quality of the first cell does not meet the service requirement.

2. The method according to claim 1, wherein the sending, by the access network device, the bearer deletion request message to the core network device when the access network device determines that radio channel quality provided by the access network device does not meet the service requirement comprises:

sending, by the access network device, the bearer deletion request message to the core network device when the access network device determines that neither the radio channel quality of the first cell of the first network in which the terminal is located nor radio channel quality of a second cell of the first network in which the terminal is located meets the service requirement, and the service requirement comprises second identification information, wherein the second identification information is used to instruct the access network device to send the bearer deletion request message to the core network device when neither the radio channel quality of the first cell nor the radio channel quality of the second cell meets the service requirement.

3. The method according to claim 1, wherein the sending, by the access network device, the bearer deletion request message to the core network device when the access network device determines that radio channel quality provided by the access network device does not meet the service requirement comprises:

sending, by the access network device, the bearer deletion request message to the core network device when the access network device determines that radio channel quality of a third cell of a second network in which the terminal is located does not meet the service requirement, or that neither radio channel quality of a second cell of the first network in which the terminal is located nor radio channel quality of the third cell of the second network in which the terminal is located meets the service requirement, or that none of the radio channel quality of the first cell of the first network in which the terminal is located, radio channel quality of the second cell of the first network in which the terminal is located, and radio channel quality of the third cell of the second network in which the terminal is located meets the service requirement, and the service requirement comprises third identification information, wherein the third identification information is used to instruct the access network device to send the bearer deletion request message to the core network device when the radio channel quality of the third cell does not meet the service requirement, or neither the radio channel quality of the second cell nor the radio channel quality of the third cell meets the service requirement, or none of the radio channel quality of the first cell, the radio channel quality of the second cell, and the radio channel quality of the third cell meets the service requirement.

4. The method according to claim 1, wherein the service requirement comprises at least one of:

service type indication information of the service, a radio channel requirement parameter of the service, coding information of the service, a coding information list of the terminal, and a terminal type of the terminal, and the coding information list of the terminal comprises coding information supported by both the terminal and an application function device.

5. The method according to claim 1, wherein after the setting up, by the access network device, the bearer for the service, and before the sending, by the access network device, the bearer deletion request message to the core network device, the method further comprises:

parsing, by the access network device, application layer signaling between the terminal and an application function device, and determining that the terminal currently uses first coding information to perform data communication of the service, wherein the first coding information comprises a first coding type and a first coding rate;

determining, by the access network device, first indication information of the service based on first current network status information of the terminal, wherein the first current network status information comprises that the access network device determines that current radio channel quality of a cell in which the terminal is located is less than a first preset threshold or that a network to which the terminal is attached is congested, the first indication information is a first transmission rate and the first transmission rate corresponds to second coding information, or the first indication information is the second coding information, and the second coding information comprises a second coding type and a second coding rate; and sending, by the access network device, a first notification message to the terminal, wherein the first notification message carries the first indication information, and the first notification message is used to instruct the terminal to adjust coding information of the service from the first coding information to the second coding information.

6. The method according to claim 5, wherein after the sending, by the access network device, the first notification message to the terminal, the method further comprises:

determining, by the access network device, second indication information of the service of the terminal based on second current network status information of the terminal, wherein the second current network status information is that the access network device determines that current radio channel quality of the cell in which the terminal is located is greater than a second preset threshold or that the network to which the terminal is attached is not congested, and the second indication information is a second transmission rate and the second transmission rate corresponds to the second coding information, or the second indication information is the second coding information; and sending, by the access network device, a second notification message to the terminal, wherein the second notification message carries the second indication information, and the second notification message is used to instruct the terminal to adjust the coding information of the service from the second coding information to the first coding information.

7. An apparatus, comprising:

at least one processor; and a memory, storing computer instructions, which when executed by the at least one processor, enable the apparatus to perform the following operations:

receiving, from a core network device, a bearer setup request message for setting up a service for a terminal, wherein the bearer setup request message requests the apparatus to set up a bearer for the service, the bearer setup request message carries a service requirement of the service, and the service requirement is used to indicate, to the apparatus, a radio channel quality requirement for executing the service by the terminal;

setting up the bearer for the service;

sending a bearer setup response message to the core network device, wherein the bearer setup response message is used to notify the core network device that the apparatus has set up the bearer for the service; and sending a bearer deletion request message to the core network device when the apparatus determines that radio channel quality provided by the apparatus does not meet the service requirement, wherein the deletion request message requests the core network device to delete the bearer, including:

sending the bearer deletion request message to the core network device when the apparatus determines that a radio channel quality of a first cell of a first network in which the terminal is located does not meet the service requirement, and the service requirement comprises first identification information, wherein the first identification information is used to instruct the apparatus to send the bearer deletion request message to the core network device when the radio channel quality of the first cell does not meet the service requirement.

8. The apparatus according to claim 7, wherein the sending the bearer deletion request message to the core network device when the apparatus determines that radio channel quality provided by the apparatus does not meet the service requirement comprises:

sending the bearer deletion request message to the core network device when the apparatus determines that neither the radio channel quality of the first cell of the first network in which the terminal is located nor a radio channel quality of a second cell of the first network in which the terminal is located meets the service requirement, and the service requirement comprises second identification information, wherein the second identification information is used to instruct the apparatus to send the bearer deletion request message to the core network device when neither the radio channel quality of the first cell nor the radio channel quality of the second cell meets the service requirement.

9. The apparatus according to claim 7, wherein the sending the bearer deletion request message to the core network device when the apparatus determines that radio channel quality provided by the apparatus does not meet the service requirement comprises:

sending the bearer deletion request message to the core network device when the apparatus determines that a radio channel quality of a third cell of a second network in which the terminal is located does not meet the service requirement, or that neither radio channel quality of a second cell of the first network in which the terminal is located nor radio channel quality of the third cell of the second network in which the terminal is located meets the service requirement, or that none of the radio channel quality of the first cell of the first network in which the terminal is located, radio channel quality of the second cell of the first network in which the terminal is located, and radio channel quality of the third cell of the second network in which the terminal is located meets the service requirement, and the service requirement comprises third identification information;

wherein the third identification information is used to instruct the apparatus to send the bearer deletion request message to the core network device when the radio channel quality of the third cell does not meet the service requirement, or neither the radio channel quality of the second cell nor the radio channel quality of the third cell meets the service requirement, or none of the radio channel quality of the first cell, the radio channel quality of the second cell, and the radio channel quality of the third cell meets the service requirement.

10. The apparatus according to claim 7, wherein the service requirement comprises at least one of:

service type indication information of the service, a radio channel requirement parameter of the service, coding information of the service, a coding information list of the terminal, and a terminal type of the terminal, and the coding information list of the terminal comprises coding information supported by both the terminal and an application function device.

11. The apparatus according to claim 7, wherein after the setting up the bearer for the service, and before sending the bearer deletion request message to the core network device, the instructions, which when executed by the at least one processor, enable the apparatus to further perform the following operations:

parsing application layer signaling between the terminal and an application function device, and determining that the terminal currently uses first coding information to perform data communication of the service, wherein the first coding information comprises a first coding type and a first coding rate;

determining first indication information of the service based on first current network status information of the terminal, wherein the first current network status information comprises that the apparatus determines that current radio channel quality of a cell in which the terminal is located is less than a first preset threshold or that a network to which the terminal is attached is congested, the first indication information is a first transmission rate and the first transmission rate corresponds to second coding information, or the first indication information is the second coding information, and the second coding information comprises a second coding type and a second coding rate; and sending a first notification message to the terminal, wherein the first notification message carries the first indication information, and the first notification message is used to instruct the terminal to adjust coding information of the service from the first coding information to the second coding information.

12. The apparatus according to claim 11, wherein after sending the first notification message to the terminal, the instructions, which when executed by the at least one processor, enable the apparatus to further perform the following operations:

determining second indication information of the service of the terminal based on second current network status information of the terminal, wherein the second current network status information is that the apparatus determines that current radio channel quality of the cell in which the terminal is located is greater than a second preset threshold or that the network to which the terminal is attached is not congested, and the second indication information is a second transmission rate and the second transmission rate corresponds to the second coding information, or the second indication information is the second coding information; and sending a second notification message to the terminal, wherein the second notification message carries the second indication information, and the second notification message is used to instruct the terminal to adjust the coding information of the service from the second coding information to the first coding information.

13. A non-transitory machine-readable medium having instructions stored therein, which when executed by one or more processors, cause the one or more processors to perform operations, the operations comprising:
- receiving, by an access network device from a core network device, a bearer setup request message for setting up a service for a terminal, wherein the bearer setup request message requests the access network device to set up a bearer for the service, the bearer setup request message carries a service requirement of the service, and the service requirement is used to indicate, to the access network device, a radio channel quality requirement for executing the service by the terminal;
- setting up, by the access network device, the bearer for the service;
- sending, by the access network device, a bearer setup response message to the core network device, wherein the bearer setup response message is used to notify the core network device that the access network device has set up the bearer for the service; and
- sending, by the access network device, a bearer deletion request message to the core network device when the access network device determines that radio channel quality provided by the access network device does not meet the service requirement, wherein the deletion request message requests the core network device to delete the bearer, including:
- sending, by the access network device, the bearer deletion request message to the core network device when the access network device determines that a radio channel quality of a first cell of a first network in which the terminal is located does not meet the service requirement, and the service requirement comprises first identification information, wherein
- the first identification information is used to instruct the access network device to send the bearer deletion request message to the core network device when the radio channel quality of the first cell does not meet the service requirement.

14. The non-transitory machine-readable medium according to claim 13, wherein the sending, by the access network device, the bearer deletion request message to the core network device when the access network device determines that radio channel quality provided by the access network device does not meet the service requirement comprises:
- sending, by the access network device, the bearer deletion request message to the core network device when the access network device determines that neither the radio channel quality of the first cell of the first network in which the terminal is located nor radio channel quality of a second cell of the first network in which the terminal is located meets the service requirement, and the service requirement comprises second identification information, wherein
- the second identification information is used to instruct the access network device to send the bearer deletion request message to the core network device when neither the radio channel quality of the first cell nor the radio channel quality of the second cell meets the service requirement.

15. The non-transitory machine-readable medium according to claim 13, wherein the sending, by the access network device, the bearer deletion request message to the core network device when the access network device determines that radio channel quality provided by the access network device does not meet the service requirement comprises:
- sending, by the access network device, the bearer deletion request message to the core network device when the access network device determines that radio channel quality of a third cell of a second network in which the terminal is located does not meet the service requirement, or that neither radio channel quality of a second cell of the first network in which the terminal is located nor radio channel quality of the third cell of the second network in which the terminal is located meets the service requirement, or that none of the radio channel quality of the first cell of the first network in which the terminal is located, radio channel quality of the second cell of the first network in which the terminal is located, and radio channel quality of the third cell of the second network in which the terminal is located meets the service requirement, and the service requirement comprises third identification information, wherein
- the third identification information is used to instruct the access network device to send the bearer deletion request message to the core network device when the radio channel quality of the third cell does not meet the service requirement, or neither the radio channel quality of the second cell nor the radio channel quality of the third cell meets the service requirement, or none of the radio channel quality of the first cell, the radio channel quality of the second cell, and the radio channel quality of the third cell meets the service requirement.

16. The non-transitory machine-readable medium according to claim 13, wherein the service requirement comprises at least one of:
- service type indication information of the service, a radio channel requirement parameter of the service, coding information of the service, a coding information list of the terminal, and a terminal type of the terminal, and the coding information list of the terminal comprises coding information supported by both the terminal and an application function device.

17. The non-transitory machine-readable medium according to claim 13, wherein after the setting up, by the access network device, the bearer for the service, and before the sending, by the access network device, the bearer deletion request message to the core network device, the method further comprises:
- parsing, by the access network device, application layer signaling between the terminal and an application function device, and determining that the terminal currently uses first coding information to perform data communication of the service, wherein the first coding information comprises a first coding type and a first coding rate;
- determining, by the access network device, first indication information of the service based on first current network status information of the terminal, wherein the first current network status information comprises that the access network device determines that current radio channel quality of a cell in which the terminal is located is less than a first preset threshold or that a network to which the terminal is attached is congested, the first indication information is a first transmission rate and the first transmission rate corresponds to second coding information, or the first indication information is the second coding information, and the second coding information comprises a second coding type and a second coding rate; and sending, by the access network device, a first notification message to the terminal, wherein the first notification message carries the first indication information, and the first notification message is used to instruct the terminal to adjust coding information of the service from the first coding information to the second coding information.

18. The non-transitory machine-readable medium according to claim 17, wherein after the sending, by the access network device, the first notification message to the terminal, the method further comprises:

determining, by the access network device, second indication information of the service of the terminal based on second current network status information of the terminal, wherein the second current network status information is that the access network device determines that current radio channel quality of the cell in which the terminal is located is greater than a second preset threshold or that the network to which the terminal is attached is not congested, and the second indication information is a second transmission rate and the second transmission rate corresponds to the second coding information, or the second indication information is the second coding information; and sending, by the access network device, a second notification message to the terminal, wherein the second notification message carries the second indication information, and the second notification message is used to instruct the terminal to adjust the coding information of the service from the second coding information to the first coding information.

\* \* \* \* \*